United States Patent
Kim et al.

(10) Patent No.: US 9,007,964 B2
(45) Date of Patent: Apr. 14, 2015

(54) METHOD AND APPARATUS FOR DEFINING TRANSCEIVING TIMING OF A PHYSICAL CHANNEL IN A TDD COMMUNICATION SYSTEM WHICH SUPPORTS CROSS-CARRIER SCHEDULING

(75) Inventors: Young Bum Kim, Seoul (KR); Joon Young Cho, Suwon-si (KR); Jin Kyu Han, Seoul (KR); Seung Hoon Choi, Suwon-si (KR); Youn Sun Kim, Seongnam-si (KR); Hyoung Ju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 13/517,388

(22) PCT Filed: Dec. 22, 2010

(86) PCT No.: PCT/KR2010/009212
§ 371 (c)(1),
(2), (4) Date: Jun. 20, 2012

(87) PCT Pub. No.: WO2011/078581
PCT Pub. Date: Jun. 30, 2011

(65) Prior Publication Data
US 2012/0257554 A1      Oct. 11, 2012

(30) Foreign Application Priority Data
Dec. 24, 2009    (KR) .................. 10-2009-0130400

(51) Int. Cl.
*H04L 5/00* (2006.01)
*H04L 5/14* (2006.01)

(52) U.S. Cl.
CPC .............. *H04L 5/0053* (2013.01); *H04L 5/001* (2013.01); *H04L 5/0048* (2013.01); *H04L 5/0055* (2013.01); *H04L 5/0091* (2013.01); *H04L 5/14* (2013.01)
USPC ........................................................ 370/280

(58) Field of Classification Search
CPC ..... H04L 5/0098; H04L 5/001; H04L 5/0091; H04L 5/0092; H04L 5/0094; H04L 5/0096; H04L 5/02; H04L 5/023; H04L 5/0048; H04L 5/0053; H04L 5/0055; H04W 72/1263; H04W 72/1288; H04W 72/1273
USPC .......................... 370/338, 280, 321, 337, 347
See application file for complete search history.

(56) References Cited

U.S. PATENT DOCUMENTS

| | | | |
|---|---|---|---|
| 8,477,699 B2* | 7/2013 | Damnjanovic et al. | 370/329 |
| 2008/0076436 A1 | 3/2008 | Sanders et al. | |
| 2011/0044259 A1* | 2/2011 | Nimbalker et al. | 370/329 |
| 2011/0070845 A1* | 3/2011 | Chen et al. | 455/91 |
| 2011/0105050 A1* | 5/2011 | Khandekar et al. | 455/68 |

(Continued)

OTHER PUBLICATIONS

LG Electronics, "Issues on DL ACK/NACK in Carrier Aggregation", 3GPP TSG RAN WG1 #58bis, R1-094160, Oct. 12-16, 2009.

(Continued)

*Primary Examiner* — Gary Mui
(74) *Attorney, Agent, or Firm* — Jefferson IP Law, LLP

(57) ABSTRACT

The present invention relates to a method for defining, in a TDD wireless communication system in which broadband is configured by means of carrier aggregation, transceiving timing for a data channel and a control channel when cross-carrier scheduling is implemented.

24 Claims, 18 Drawing Sheets

(56) References Cited

U.S. PATENT DOCUMENTS

| | | | |
|---|---|---|---|
| 2011/0128922 A1* | 6/2011 | Chen et al. | 370/329 |
| 2012/0014330 A1* | 1/2012 | Damnjanovic et al. | 370/329 |
| 2012/0039180 A1* | 2/2012 | Kim et al. | 370/241 |
| 2012/0044921 A1* | 2/2012 | Chung et al. | 370/338 |
| 2012/0069795 A1* | 3/2012 | Chung et al. | 370/315 |
| 2012/0113941 A1* | 5/2012 | Chung et al. | 370/329 |
| 2012/0177000 A1* | 7/2012 | Seo et al. | 370/329 |
| 2012/0230239 A1* | 9/2012 | Park et al. | 370/311 |
| 2013/0201921 A1* | 8/2013 | Chen et al. | 370/329 |

OTHER PUBLICATIONS

New Postcom et al., "Timing association between HS-SCCH and SPS HS-PDSCH for LCR TDD", 3GPP TSG RAN WG1 #58bis, R1-093752, Oct. 12-16, 2009.

Nokia Siemens Networks et al., "Issues with Cross-Component Carrier Scheduling", 3GPP TSG RAN WG1 #58bis, R1-093903, Oct. 12-16, 2009.

NEC Group, "Downlink cross-carrier control structure for LTE-Advanced", 3GPP TSG TAN WG1 #58bis, R1-093860, Oct. 12-16, 2009.

\* cited by examiner

METHOD AND APPARATUS FOR DEFINING TRANSCEIVING TIMING OF A PHYSICAL CHANNEL IN A TDD COMMUNICATION SYSTEM WHICH SUPPORTS CROSS-CARRIER SCHEDULING

BACKGROUND OF THE INVENTION

1. Field of the Invention

The present invention relates to a cellular radio communication system and, in particular, to a method and apparatus for defining transmission/reception timing of physical channel in cross-carrier scheduling of TDD system supporting carrier aggregation.

2. Description of the Related Art

Recently, there are many researches being conducted on the Orthogonal Frequency Division Multiple Access (OFDMA) and Single Carrier-Frequency Division multiple Access (SC-FDMA) in the cellular communication field. Such a multiple access technology is used to allocate and manage the time-frequency resources for data and/or control information transmission to and from multiple users without overlapping from each other, i.e. orthogonally, so as to makes it possible to discriminate among per-user data and control informations.

One of the significant features of the cellular communication system is to support scalable bandwidth for providing high speed wireless data service. For example, the Long Term Evolution (LTE) system is capable of supporting various bandwidths, e.g. 20/15/5/3/1.4 Mhz. The mobile carriers can provide their services with one of the available bandwidths. A User Equipment (UE) can operate with various capabilities of minimum 1.4 MHz bandwidth up to 20 MHz bandwidth. Meanwhile, the LTE-Advanced (hereinafter, called LTE-A) system can support high data rate transmission over a wide bandwidth up to 100 MHz for a single UE with carrier aggregation.

In order to support the high data rate transmission, the LTE-A system requires the bandwidth wider than that of the LTE system while preserving backward compatibility to the legacy systems for supporting the LTE UEs. For the backward compatibility, the system bandwidth of the LTE-A system is divided into a plurality of subbands or component carriers (CC) that can be used for transmission/reception of LTE UEs and aggregated for the high data rate transmission of the LTE-A system with the transmission/reception process of the legacy LTE system per component carrier.

The scheduling information for the data transmitted on the component carriers is transmitted to the UE in Downlink Control Information (DCI). The DCI is generated in different DCI format according to whether scheduling information is of uplink or downlink, whether the DCI is compact DCI, whether spatial multiplexing with multiple antennas is applied, and whether the DCI is the power control DCI. For example, the DCI format 1 for the control information about downlink data to which Multiple Input Multiple Output (MIMO) is not applied is composed of the following control informations.

Resource allocation type 0/1 flag: It notifies the UE of whether the resource allocation type is type 0 or type 1. Here, type 0 indicates resource allocation in unit of resource block group (RBG) in bitmap method. In LTE and LTE-A systems, the basic scheduling unit is resource block (RB) representing time and frequency resource, and RBG is composed of a plurality of RBs and basic scheduling unit of in type 0. Type 1 indicates allocation of specific RB in RBG.

Resource block assignment: It notifies the UE of RB allocated for data transmission. At this time, the resource expressed according to the system bandwidth and resource allocation scheme is determined.

Modulation and coding scheme: It notifies the UE of modulation scheme and coding rate applied for data transmission.

HARQ process number: it notifies the UE of HARQ process number.

New data indicator: It notifies the UE of whether the transmission is

HARQ initial transmission or retransmission.

Redundancy version: It notifies the UE of redundancy version of HARQ.

TPC command for PUCCH: It notifies the UE of power control command for Physical Uplink Control Channel (PUCCH) as uplink control channel.

The DCI is channel-coded and modulated and then transmitted through Physical Downlink Control Channel (PDCCH).

FIG. 1 is a diagram illustrating an exemplary case where an eNB schedules downlink data for a UE with two aggregated carriers (CC#1, CC#2) in the LTE system. In FIG. 1, the DCI 1 101 to be transmitted on the Component Carrier #1 (CC#1) 109 is generated with a format defined in the legacy LTE and channel coded and interleaved so as to be carried by PDCCH 103. The PDCCH 103 carries the scheduling information about the Physical Downlink Shared Channel 213 as the data channel allocated to the UE on the CC#1 109. The DCI 105 transmitted on the component carrier #2 (CC#2) 111 is formatted as defined in the legacy LTE standard, channel-coded, and then interleaved to generate PDCCH 107. The PDCCH 107 carries the scheduling information about the PDSCH 115 as the data channel allocated to the UE on the CC#2 111.

In the LTE-A system supporting carrier aggregation, the data and/or DCI for supporting the data transmission can be transmitted per component carrier as shown in FIG. 1. In case of DCI, however, it can be transmitted on another component carrier different from the component carrier carrying the data, and this is referred to as cross-carrier scheduling. That is, the scheduling information about the data transmitted on the CC#2 is transmitted on the CC#1. The cross-carrier scheduling is described hereinafter in detail with reference to FIG. 2.

FIG. 2 is a diagram illustrating a procedure for scheduling an LTE-A UE using aggregated component carriers #1 and #2 (CC#1 and CC#2) 209 and 219. FIG. 2 is directed to an exemplary case where the CC#2 219 experiences significant interference as compared to CC#1 209 such that it is difficult to satisfy a predetermined DCI reception performance requirement for data transmission on the CC#2 219. In this case, the eNB may transmit the DCI on the CC#1 219. Since any error occurring in data transmission can be corrected later through HARQ, there is no problem in transmitting data on the CC#2 although significant interference exists thereon. In order to make it possible to operate as above, it is necessary for the eNB to transmit a carrier indicator (CI) indicating the component carrier targeted by the DCI along with the DCI indicating the resource allocation information and transmission format of the scheduled data. For example, CI='00' indicates CC#1 209 and, CI='01' indicates CC#2 219.

Accordingly, the eNB combines the DCI 201 indicating resource allocation information and transmission format of the scheduled data 207 and the carrier indicator 202 to generate an extended DCI, performs channel coding, modulation, and interleaving on the extended DCI to generate PDCCH, and maps the PDCCH to the PDCCH region 205 of CC#1 209. The eNB also combines the DCI 211 indicating the resource allocation information and transmission format of the data 217 scheduled on CC#2 and the carrier indicator 212 to generate an extended DCI, performs channel coding, modulation and interleaving on the extended DCI to generate PDCCH, and maps the PDCCH to the PDCCH region 205 of CC#1 209.

The TDD system uses a common frequency for uplink and downlink which are discriminated in time domain. In the LTE TDD system, the uplink and downlink signals are discriminated by subframe. A radio frame can be divided into equal number of uplink and downlink subframes according to the uplink and downlink traffic load, but the number of uplink subframes may greater than that of the downlink subframes and vice versa. In the LTE system, the subframe has a length of 1 ms, 10 subframes form a radio frame.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | u | u | u | D | S | u | u | u |
| 1 | D | S | u | u | D | D | S | u | u | D |
| 2 | D | S | u | D | D | D | S | u | D | D |
| 3 | D | S | u | u | u | D | D | D | D | D |
| 4 | D | S | u | u | D | D | D | D | D | D |
| 5 | D | S | u | D | D | D | D | D | D | D |
| 6 | D | S | u | u | u | D | S | u | u | D |

Table 1 shows TDD configurations (TDD uplink-downlink configurations) defined in LTE standard. In table 1, subframe numbers 0 to 9 indicates the indices of subframes constituting one radio frame. Here, 'D' denotes a subframe reserved for downlink transmission, 'U' denotes a subframe reserved for uplink transmission, and 'S' denotes the special subframe. The DwPTS can carry the downlink control information as the normal subframe does. If the DwPTS is long enough according to the configuration state of the special subframe, it is possible to carry the downlink data too. The GP is the interval required for downlink-to-uplink switch and its length is determined according to the network configuration. The UpPTS can be used for transmitting UE's Sounding Reference Signal (SRS) for uplink channel state estimation and UE's Random Access Channel (RACH).

For example, in case of TDD uplink-downlink configuration#6, the eNB can transmit downlink data and/or control information at subframes #0, #5, and #9 and uplink data and/control information at subframes #2, #3, #4, #7, and #8. Here, # indicates number or index. The subframes #1 and #6 as special subframes can be used for transmitting downlink control information and/or downlink data selectively and SRS or RACH in uplink.

Since the downlink or uplink transmission is allowed for specific time duration in the TDD system, it is necessary to define the timing relationship among the uplink and downlink physical channels such as control channel for data scheduling, scheduled data channel, and HARQ ACK/NACK channel (HARQ acknowledgement) corresponding to the data channel.

In the TDD system, the timing relationship between Physical Downlink Shared Channel (PDSCH) and Physical Uplink Control channel (PUCCH) carrying uplink HARQ ACK/NACK corresponding to the PDSCH or Physical Uplink Shared Channel (PUSCH) is as follows.

The UE receives the PDSCH transmitted by the eNB at $(n-k)^{th}$ subframe and transmits uplink HARQ ACK/NACK corresponding to the received PDSCH at $n^{th}$ subframe. Here, k denotes an element of a set K, and K is defined as shown in table 2.

TABLE

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 3 is a diagram illustrating a timing relationship between PDSCH and uplink HARQ ACK/NACK to show which subframe carries uplink HARQ ACK/NACK corresponding to PDSCH that is transmitted in a downlink subframe or a special subframe in TDD uplink-downlink configuration 6 as defined in table 2. For example, the UE transmits, at subframe #7 of $i^{th}$ radio frame, the uplink HARQ ACK/NACK corresponding to the PDSCH 301 transmitted by the eNB at subframe #1 of $i^{th}$ subframe. At this time, the downlink control information (DCI) including the scheduling information on the PDSCH 301 is transmitted through PDCCH of the subframe which also carries PDSCH. For another example, the UE transmits, at the subframe #4 307 of $(i+1)^{th}$ radio frame, the uplink HARQ ACK/NACK corresponding to PDSCH 305 transmitted by the eNB at subframe #9 of the $i^{th}$ radio frame. Likewise, the downlink control information (DCI) including the scheduling information on the PDSCH 305 is transmitted through PDCCH of the subframe which also carries PDSCH.

The LTE adopts an asynchronous HARQ in downlink in which the data retransmission timing is not fixed. That is, when an HARQ ACK fed back by the UE in response to the HARQ initial transmission data transmitted by the eNB is received, the eNB determines the next HARQ retransmission timing freely according to the scheduling operation. The UE buffers the data failed in decoding for HARQ operation and combines the buffered data with the next HARQ retransmission data. In order to keep the reception buffer space to a predetermined level, a maximum number of HARQ processes are defined per TDD uplink-downlink configuration as shown in table 3. One HARQ process is mapped to one subframe in time domain.

TABLE 3

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Referring to table 3, if it fails to decode the PDSCH 301 transmitted by the eNB at subframe #0 of the $i^{th}$ radio frame, the UE transmits an HARQ NACK at the subframe #7 of $i^{th}$ radio frame. Upon receipt of the HARQ NACK, the eNB configures the retransmission data corresponding to PDSCH 301 as PDSCH 309 and transmits the PDSCH 309 along with PDCCH. In the exemplary case of FIG. 3, the retransmission data is transmitted in the subframe #1 of $(i+1)^{th}$ radio frame by taking notice that the maximum number of downlink HARQ processes is 6 in the TDD uplink-downlink configuration #6 according to the definition of table 3. This means that there are total 6 downlink HARQ processes 311, 312, 313, 314, 315, and 316 between the initial transmission, i.e. PDSCH 301, and the retransmission, i.e. PDSCH 309.

The LTE system adopts synchronous HARQ having fixed data transmission points in uplink unlike the downlink HARQ. That is, the uplink/downlink timing relationship among the Physical Uplink Shared Channel (PUSCH), Physical Downlink Control Channel (PDCCH) followed by the PUSCH, and Physical Hybrid Indicator Channel (PHICH) carrying the downlink HARQ ACK/NACK corresponding to the PUSCH are fixed according to a rule as follows.

If the PDCCH including DCI format 0 as uplink scheduling control information or the PHICH carrying the downlink HARQ ACK/NACK is received from the eNB at $n^{th}$ subframe, the UE transmits the PUSCH carrying uplink data corresponding to the control information at $(n+k)^{th}$ subframe. Here, k is denoted as shown in table 4.

TABLE 4

| TDDUL/DL | DL subframe number n | | | | | | | | | |
|---|---|---|---|---|---|---|---|---|---|---|
| Configuratio | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

If the PHICH carrying downlink HARQ ACK/NACK is received from the eNB at $i^{th}$ subframe, the PHICH corresponds to the PUSCH transmitted by the UE at $(i+k)^{th}$ subframe. Here, k is defined as shown in table 5.

TABLE 5

| TDDUL/DL | DL subframe number i | | | | | | | | | |
|---|---|---|---|---|---|---|---|---|---|---|
| Configuratio | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 4 is a diagram illustrating the subframes carrying PUSCH corresponding to the PDCCH or PHICH carried in downlink or special subframe and the subframes carrying PHICH corresponding to the PUSCH according to the definition of tables 4 and 5 in case of TDD uplink-downlink configuration #1. For example, the PUSCH corresponding to the PDCCH or PHICH 401 transmitted by the eNB at subframe #1 of $i^{th}$ radio frame is transmitted by the UE at subframe #7 of ith radio frame (403). The eNB transmits PHICH to the UE at subframe #1 of $(i+1)^{th}$ radio frame (405). For another example, the PUSCH corresponding to PDCCH or PHICH 407 transmitted by the eNB at subframe #6 of ith subframe is transmitted by the UE at subframe #2 of $(i+1)^{th}$ radio frame (409). The eNB transmits PHICH corresponding to the PUSCH to the UE at subframe #6 of $(i+1)^{th}$ radio frame (411).

In association with PUSCH transmission in LTE TDD system, the downlink transmission of PDCCH or PHICH corresponding to PUSCH is restricted a specific downlink subframe to guarantee minimum transmission/reception processing time of the eNB and UE. For example, in case of the TDD downlink-uplink configuration #1 of FIG. 4, the PDCCH for PUSCH scheduling or the PHICH corresponding to PUSCH is muted at subframes #0 and #5.

In case of adopting the timing relationship among the physical channels that is designed for the LTE TDD system to the LTE-A system, there is a need of defining extra operation in addition to the legacy timing relationship. In detail, if the cross-carrier scheduling is applied for the case where TDD uplink-downlink configurations of the respective aggregated carriers differ from each other, it is required to define timing relationships between PDCCH and cross-carrier scheduled PDCCH, between cross-carrier scheduled PUSCH and PHICH, and between cross-scheduled PDSCH and uplink HARQ ACK/NACK.

DISCLOSURE OF INVENTION

Technical Problem

The present invention has been made in an effort to solve the above problem and it is an object of the present invention to define timing relationships between PDCCH and cross-carrier scheduled PUSCH, between cross-carrier scheduled PUSCH and PHICH, and cross-carrier scheduled PDSCH and uplink HARQ ACK/NACK in the TDD radio communication system securing broad bandwidth through carrier aggregation especially when the TDD uplink-downlink configurations of the aggregated carriers differ from each other.

Solution to Problem

In accordance with an aspect of the present invention, a physical channel transmission/reception method of a base station in a TDD radio communication system securing broad bandwidth through carrier aggregation when aggregated carriers are configured with different TDD uplink-downlink configurations includes a first transmission step of transmitting, when cross-carrier scheduling is determined, a downlink control channel on a first component carrier; and a second transmission step of transmitting a downlink control channel on a second component carrier according to a transmission timing rule predetermined between the downlink control and data channels.

In this case, the second transmission step characterized in that the downlink control channel and the downlink data channel are transmitted at a subframe configured as downlink subframe on both the first and second component carriers.

In accordance with another aspect of the present invention, a physical channel transmission/reception method of a terminal in a TDD radio communication system securing broad bandwidth through carrier aggregation when aggregated carriers are configured with different TDD uplink-downlink configurations includes a first reception step of receiving, when cross-carrier scheduling is determined, a downlink control channel on a first component carrier; and a second reception step of receiving a downlink data channel scheduled by the downlink control channel on a second component carrier according to a transmission timing rule predetermined between downlink control channel and the downlink data channel.

In this case, the second reception step is characterized in that the downlink control channel and the downlink data channel are received at a subframe configured as downlink subframe on both the first and second component carries.

In accordance with another aspect of the present invention, a base station for transmitting/receiving physical channels in a TDD radio communication system securing broad bandwidth through carrier aggregation when aggregated carriers are configured with different TDD uplink-downlink configurations includes a transceiver which transmits/receives at least one physical channel; and a carrier aggregation and timing controller which controls transmitting, when cross-carrier scheduling is determined, a downlink control channel on a first component carrier and transmitting a downlink control channel on a second component carrier according to a transmission timing rule predetermined between the downlink control and data channels.

In this case, the carrier aggregation and timing controller controls transmitting the downlink control channel and the downlink data channel at a subframe configured as downlink subframe on both the first and second component carriers.

In accordance with another aspect of the present invention, a terminal for transmitting/receiving physical channels terminal in a TDD radio communication system securing broad bandwidth through carrier aggregation when aggregated carriers are configured with different TDD uplink-downlink configurations includes a transceiver which transmits/receives at least one physical channel; and a carrier aggregation and timing controller which controls receiving, when cross-carrier scheduling is determined, a downlink control channel on a first component carrier and receiving a downlink data channel scheduled by the downlink control channel on a second component carrier according to a transmission timing rule predetermined between downlink control channel and the downlink data channel.

In this case, the carrier aggregation and timing controller controls receiving the downlink control channel and the downlink data channel at a subframe configured as downlink subframe on both the first and second component carries.

In accordance with another aspect of the present invention, a physical channel transmission/reception method of a base station in a TDD radio communication system securing broad bandwidth through carrier aggregation when aggregated carriers are configured with different TDD uplink-downlink configurations includes steps of transmitting, when cross-carrier scheduling is determined, a downlink control channel at a certain subframe of a first component carrier; and receiving uplink data channel scheduled by the downlink control channel at an uplink subframe of a second component carrier which arrives first after at least j subframes since the subframe carried the downlink control channel.

In accordance with another aspect of the present invention, a physical channel transmission/reception method of a terminal in a TDD radio communication system securing broad bandwidth through carrier aggregation when aggregated carriers are configured with different TDD uplink-downlink configurations includes steps of receiving, when cross-carrier scheduling is determined, a downlink control channel at a certain subframe of a first component carrier; and transmitting an uplink data channel scheduled by the downlink control channel at an uplink subframe of a second component carrier which arrives first after at least j subframes since the subframe carried the downlink control channel.

In accordance with another aspect of the present invention, a physical channel transmission/reception method of a base station in a TDD radio communication system securing broad bandwidth through carrier aggregation when aggregated carriers are configured with different TDD uplink-downlink configurations includes steps of transmitting, when cross-carrier scheduling is determined, a downlink control channel at a certain subframe of a first component carrier; and receiving an uplink data channel scheduled by the downlink control channel at an uplink subframe of the second component carrier, wherein the downlink control channel is transmitted at a subframe nearest to the subframe carrying the uplink data channel among the downlink subframes of the first component carrier before at least j subframes preceding the subframe of the second component carrier at which the downlink data channel is received.

In accordance with another aspect of the present invention, a physical channel transmission/reception method of a terminal in a TDD radio communication system securing broad bandwidth through carrier aggregation when aggregated carriers are configured with different TDD uplink-downlink configurations includes steps of receiving, when cross-carrier scheduling is determined, a downlink control channel at a certain subframe of a first component carrier; and transmitting an uplink data channel scheduled by the downlink control channel at an uplink subframe of a second component carrier, wherein the downlink control channel is received at a subframe nearest to the subframe carried the uplink data channel among the downlink subframes of the first component carrier before at least j subframe preceding the subframe of the second component carrier at which the uplink data channel is received.

In accordance with another aspect of the present invention, a base station for transmitting/receiving physical channels in a TDD radio communication system securing broad bandwidth through carrier aggregation when aggregated carriers are configured with different TDD uplink-downlink configurations includes a transceiver which transmits/receives at least one physical channel; and a carrier aggregation and timing controller which controls transmitting, when cross-carrier scheduling is determined, a downlink control channel on a first component carrier and receiving uplink data channel scheduled by the downlink control channel at an uplink subframe of a second component carrier which arrives first after at least j subframes since the subframe carried the downlink control channel.

In accordance with another aspect of the present invention, a terminal for transmitting/receiving physical channels in a TDD radio communication system securing broad bandwidth through carrier aggregation when aggregated carriers are configured with different TDD uplink-downlink configurations includes a transceiver which transmits/receives at least one physical channel; and a carrier aggregation and timing controller which controls receiving, when cross-carrier scheduling is determined, a downlink control channel at a certain subframe of a first component carrier and transmitting an uplink data channel scheduled by the downlink control channel at an uplink subframe of a second component carrier which arrives first after at least j subframes since the subframe carried the downlink control channel.

In accordance with an aspect of the present invention, a base station for transmitting/receiving physical channels in a TDD radio communication system securing broad bandwidth through carrier aggregation when aggregated carriers are configured with different TDD uplink-downlink configurations includes a transceiver which transmits/receives at least one physical channel; and a carrier aggregation and timing controller which controls transmitting, when cross-carrier scheduling is determined, a downlink control channel at a certain subframe of a first component carrier and receiving an uplink data channel scheduled by the downlink control channel at an uplink subframe of the second component carrier, wherein the downlink control channel is transmitted at a subframe nearest to the subframe carrying the uplink data channel among the downlink subframes of the first component carrier before at least j subframes preceding the subframe of the second component carrier at which the downlink data channel is received.

In accordance with still another aspect of the present invention, a terminal for transmitting/receiving physical channels in a TDD radio communication system securing broad bandwidth through carrier aggregation when aggregated carriers are configured with different TDD uplink-downlink configurations includes a transceiver which transmits/receives at least one physical channel; and a carrier aggregation and timing controller which controls receiving, when cross-carrier scheduling is determined, a downlink control channel at a certain subframe of a first component carrier and transmitting an uplink data channel scheduled by the downlink control channel at an uplink subframe of a second component carrier, wherein the downlink control channel is received at a subframe nearest to the subframe carried the uplink data channel among the downlink subframes of the first component carrier before at least j subframe preceding the subframe of the second component carrier at which the uplink data channel is received.

Advantageous Effects

As described above, the present invention is capable of mitigating data and control channel transmission error and transmission delay by defining the detailed transmission timings of the physical channels carrying data and control information in the TDD radio communication system securing broad bandwidth through carrier aggregation.

DETAILED DESCRIPTION OF EXEMPLARY EMBODIMENTS

Figure 1:
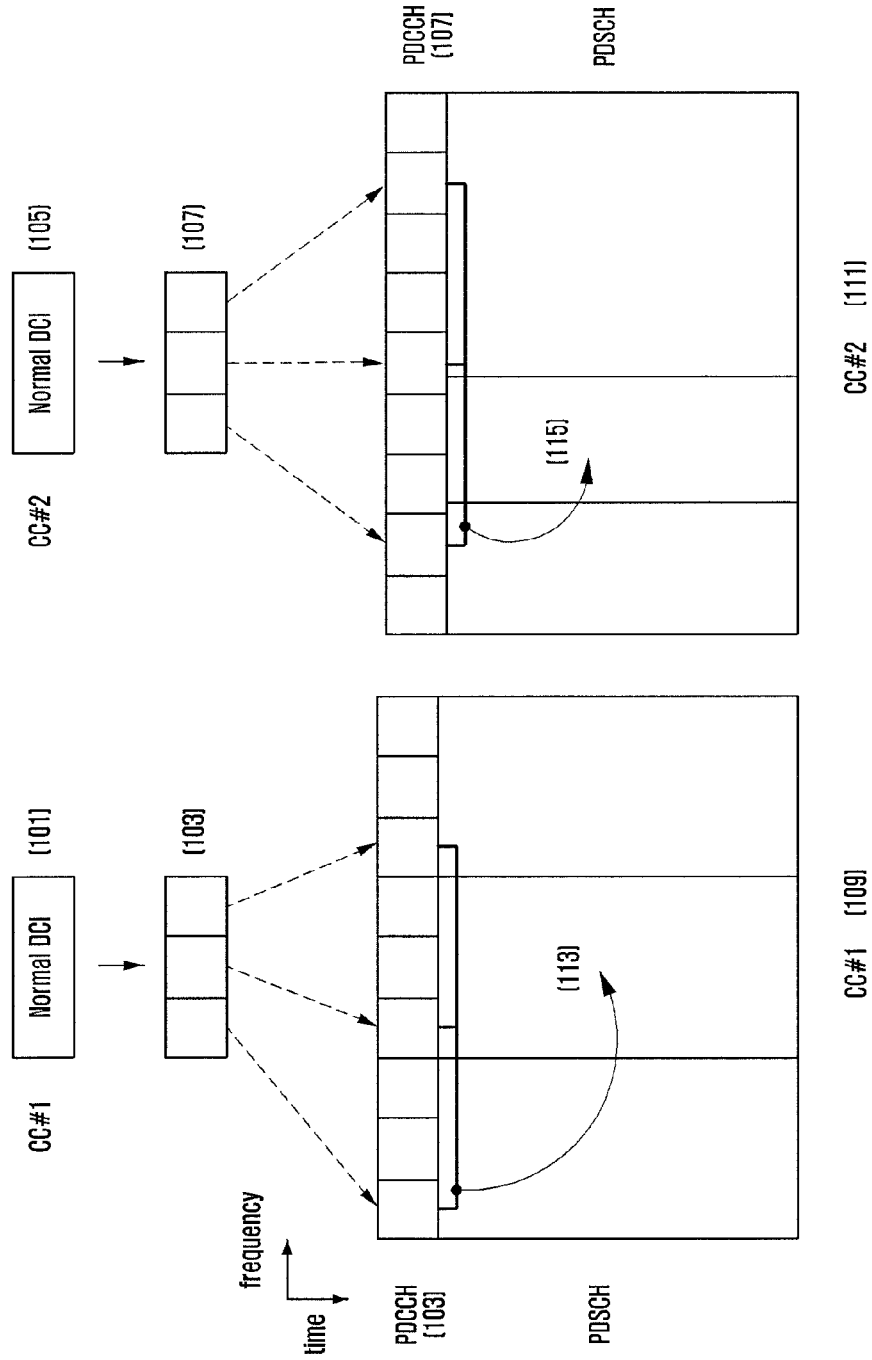
FIG. 1 is diagram illustrating an exemplary carrier aggregation in an LTE-A system.
Figure 2:
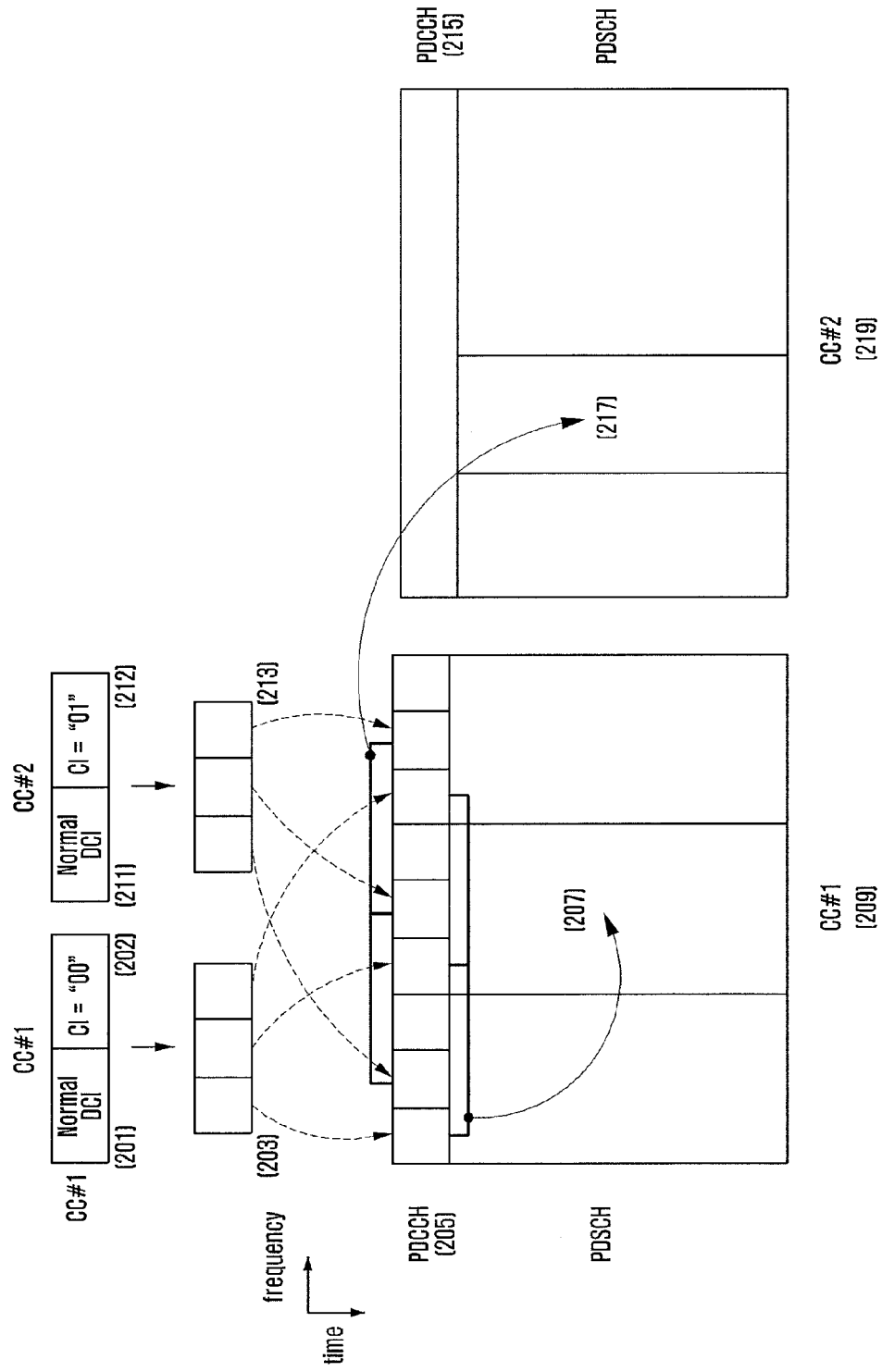
FIG. 2 is a diagram illustrating an exemplary cross-carrier scheduling operation in the LTE-A system supporting carrier aggregation.
Figure 3:
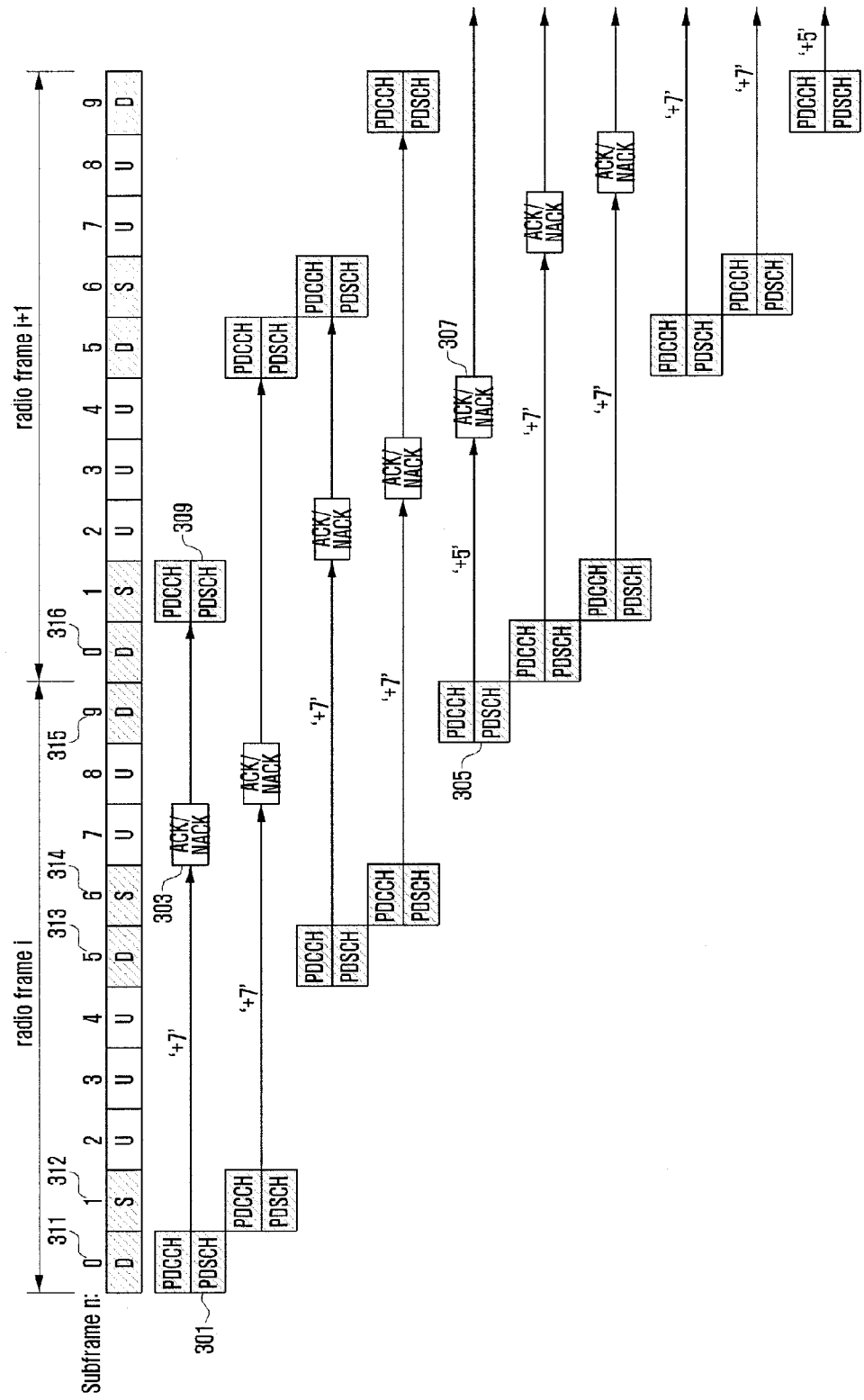
FIG. 3 is a diagram illustrating a timing relationship between PDSCH and uplink HARQ ACK/NACK in TDD uplink-downlink configuration #6 of the LTE system.
Figure 4:
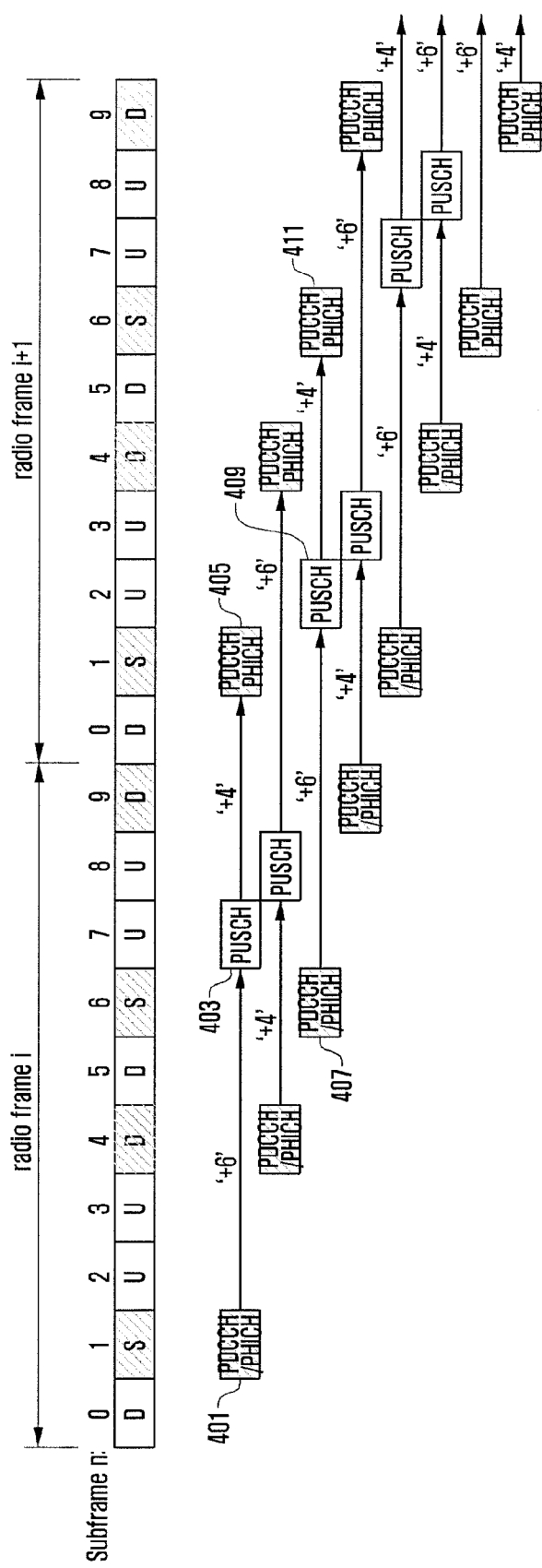
FIG. 4 is a diagram illustrating a timing relationship among PDSCH/PHICH, PUSCH, and PHICH in TDD uplink-downlink configuration #1 of the LTE system.

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although a detailed description of the present invention is given herein with reference to the Advanced E-UTRA (or LTE-A) system supporting carrier aggregation, it will be understood by those skilled in the art that the present invention can be applied even to other communication systems having the similar technical background and channel format, with a slight modification, without departing from the spirit and scope of the present invention. For example, the subject matter of the present invention can be applied to the multi-carrier HSPA supporting carrier aggregation.

The subject matter of the present invention is to define the timing relationship between the PDCCH and cross-carrier scheduled PUSCH, between cross-carrier scheduled PUSCH and PHICH, and cross-carrier scheduled PDSCH and uplink HARQ ACK/NACK in the TDD radio communication system supporting carrier aggregation especially when the TDD uplink-downlink configurations of the aggregated carriers differ from each other.

In the LTE-A system supporting carrier aggregation, if the component carrier carrying the downlink control information (DCI) and the component carrier carrying the data scheduled by the DCI differ from each other, such a scheduling is referred to as cross-carrier scheduling. The cross-carrier scheduling is applicable for downlink and uplink data transmissions respectively.

For convenience purpose, the component carrier carrying DCI is referred to as 'first component carrier' and the component carrier carrying data scheduled by the DCI is referred to as 'second component carrier' in cross-carrier scheduling operation according to the present invention.

In the LTE-A system supporting carrier aggregation, if the aggregated frequency bands are not consecutive, it is possible to assign different TDD uplink-downlink configurations to the respective component carriers according to a system operation scenario. For example, the first component carrier is configured with equal numbers of uplink and downlink subcarriers in time domain while the second component carrier is configured with a number of downlink subframes greater than that of the uplink subframes to extend the downlink capacity. For another example, by taking notice of compatibility with TD-SCDMA as the conventional 3G TDD system, the first component carrier is configured with TDD uplink-downlink configuration maintaining compatibility with the TD-SCDMA to avoid interference between TD-SCDMA and LTE TDD system while the second component carrier is configured with the TDD uplink-downlink configuration according to the traffic load without other restriction.

A descriptions is made of the method for defining the timing relationship among PDCCH, PDSCH, and UL HARQ ACK/NACK in association with DL data transmission first and then the method for defining the timing relationship among PDCCH, PUSCH, and PHICH in association with UL data transmission. The present invention is applicable to the system supporting carrier aggregation to secure broad bandwidth without restriction to the number of aggregate component carriers.

First Embodiment

The first embodiment describes a method for defining timing relationship among PDCCH, PDSCH, and UL HARQ ACK/NACK in association with downlink data transmission in the TDD radio communication system supporting carrier aggregation when the aggregated carriers are configured with different TDD uplink-downlink configurations.

The description is made in detail hereinafter with reference to the example of FIG. 5.

Figure 5:
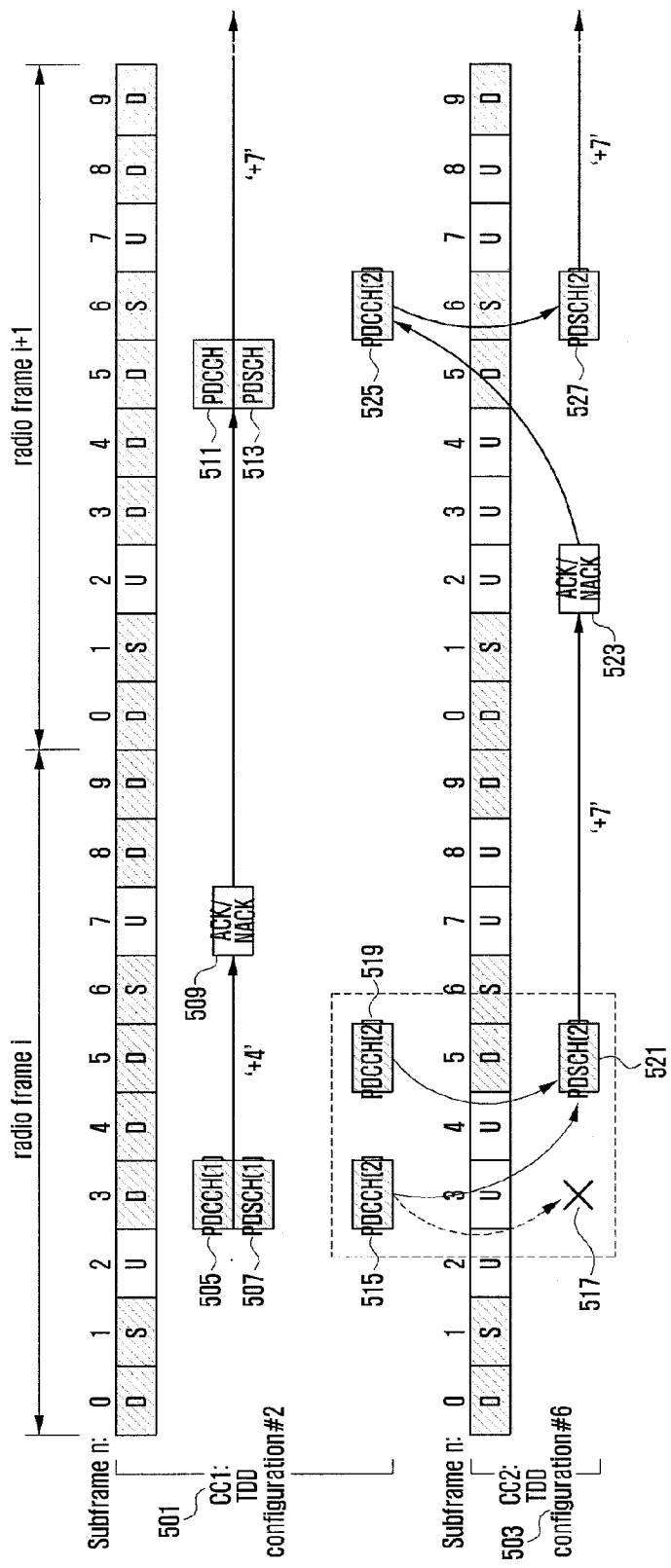
FIG. 5 is a diagram illustrating a timing relationship between PDSCH and uplink ACK/NACK according to the first embodiment of the present invention.

FIG. 5 shows an example of the TDD system operating with two aggregated component carriers: CC1 501 with TDD uplink-downlink configuration #2 and CC2 503 with TDD uplink-downlink configurations #6. Although FIG. 5 is directed to the example in which CC1 and CC2 have the same frame timing, the present invention is applicable to the cases where the radio frame timings of the component carriers mismatch with each other.

In FIG. 5, the PDSCH scheduling operation on the CC1, i.e. the operation ruled out the cross-carrier scheduling, is identical with that in the legacy LTE TDD system. For example, transmits the PDCCH 505 for scheduling the PDSCH 507 on the CC1 at subframe #3 of the ith radio frame which has been configured as a downlink subframe at the same subframe #3 on the component carrier CC1. The UE transmits the HARQ ACK/NACK 509 corresponding to PDSCH 507 at the subframe #7 of the ith radio frame which is the fourth subframe after the subframe where the PDSCH 507 is received. As described above, since the LTE system adopts asynchronous HARQ as downlink HARQ, the PDSCH retransmission timing varies according to the eNB scheduling. By taking notice of 10 downlink HARQ processes on the CC1 as many as the maximum number of downlink HARQ processes in the TDD uplink-downlink configuration #2 defined in table 3, the eNB transmits the scheduling control information on the data retransmission (i.e. PDCCH 511) and the retransmission data (i.e. PDSCH 513) at the subframe #5 of the $(i+1)^{th}$ radio frame which is $7^{th}$ subframe after the HARQ ACK/NACK transmission timing 509 of the UE. That is, there are 10 downlink HARQ processes between the initial transmission (PDSCH) 507 and retransmission (PDSCH) 513.

The operation for scheduling PDSCH to be transmitted on CC2 is scheduled by PDCCH transmitted on CC1, i.e. cross-carrier scheduling, is not defined in the legacy LTE system and thus it is necessary to define such a cross-carrier scheduling operation newly.

The timing relationship between PDCCH carrying the cross-carrier scheduling information and PDSCH following the PDCCH is defined first.

In the example of FIG. 5, the eNB is to transmit the PDCCH 515 for scheduling PDSCH of CC2 at subframe #3 of the ith radio frame which has been configured as downlink subframe on the CC1. This is the case where the CC1 operates as the first component carrier and the CC2 as the second component carrier. However, the subframe of the CC2 is configured as uplink subframe at the same timing such that the eNB cannot perform downlink transmission at the corresponding subframe as denoted by reference number 517. There are two methods to solve this problem as follows.

Method A: Cross-carrier scheduling is allowed for both the first and second component carriers at the subframe configured as downlink subframe. For example, the PDCCH 519 for cross-carrier scheduling and PDSCH 521 are transmitted on the CC1 and CC2 respectively at the subframe #5 of the ith radio frame which is configured as the downlink subframe on both the CC1 and CC2, the subframe #5 arriving first after the subframe #3 of the ith radio frame.

Method B: In case that the first component carrier is of downlink subframe and the second component carrier is of uplink subframe at a certain timing, the PDCCH to be transmitted on the first component carrier is used for cross-carrier scheduling the PDSCH at the downlink subframe of the second component carrier which arrives first since the PDCCH transmission timing on the first component carrier. For example, if the eNB transmits PDCCH 515 for cross-carrier scheduling the PDSCH on the CC2 at the subframe #3 of the ith radio frame, the PDSCH 521 is transmitted at the subframe #5 of the ith radio frame which is the downlink subframe arrives first since the subframe #3 of the ith radio frame on the CC2.

If the PDSCH 521 is received at the subframe #5 of the ith radio frame on the CC2, the UE transmits uplink HARQ ACK/NACK 523 at the subframe #2 of the $(i+1)^{th}$ radio frame after 7 subframes according to the TDD uplink-downlink configuration #6 as defined in table 2. That is, the UE receives PDSCH from the eNB and, since component carrier on which the uplink HARQ ACK/NACK is to be transmitted in correspondence to the PDSCH is identical, applies the rule determined in the legacy LTE TDD system according to the TDD uplink-downlink configuration applied to the second component carrier.

If the uplink HARQ ACK/NACK 523 indicates NACK, then eNB retransmits PDCCH with the determination on whether to perform cross-carrier scheduling again. However, the PDSCH retransmission is performed on the same component carrier as the PDSCH initial transmission. If it is determined to perform cross-carrier scheduling on the PDSCH retransmission, the eNB transmits the scheduling information (PDCCH) 525 for the data transmission at the subframe #6 of the $(i+1)^{th}$ radio frame after 4 subframes from the HARQ ACK/NACK transmission 523 of the UE on the CC1 by taking notice of 6 HARQ processes as many as the maximum downlink HARQ processes of the TDD uplink-downlink configuration #6 defined in table 3.

Since the subframe is configured as downlink subframe on the CC2 at the same timing, the eNB transmits the retransmission data (PDSCH) 513 at the subframe #6 of the $(i+1)^{th}$ radio frame to the UE.

Summering the operation of the first embodiment, the timing relationship between PDCCH carrying the cross-carrier scheduling information and the PDSCH can be determined with one of methods A and B. The timing relationship between the PDSCH received from the eNB and the HARQ ACK/NACK transmitted by the UE in uplink is determined with the application of the rule defined in the legacy LTE TDD system according to the TDD uplink-downlink configuration applied to the second component carrier.

Figure 6:
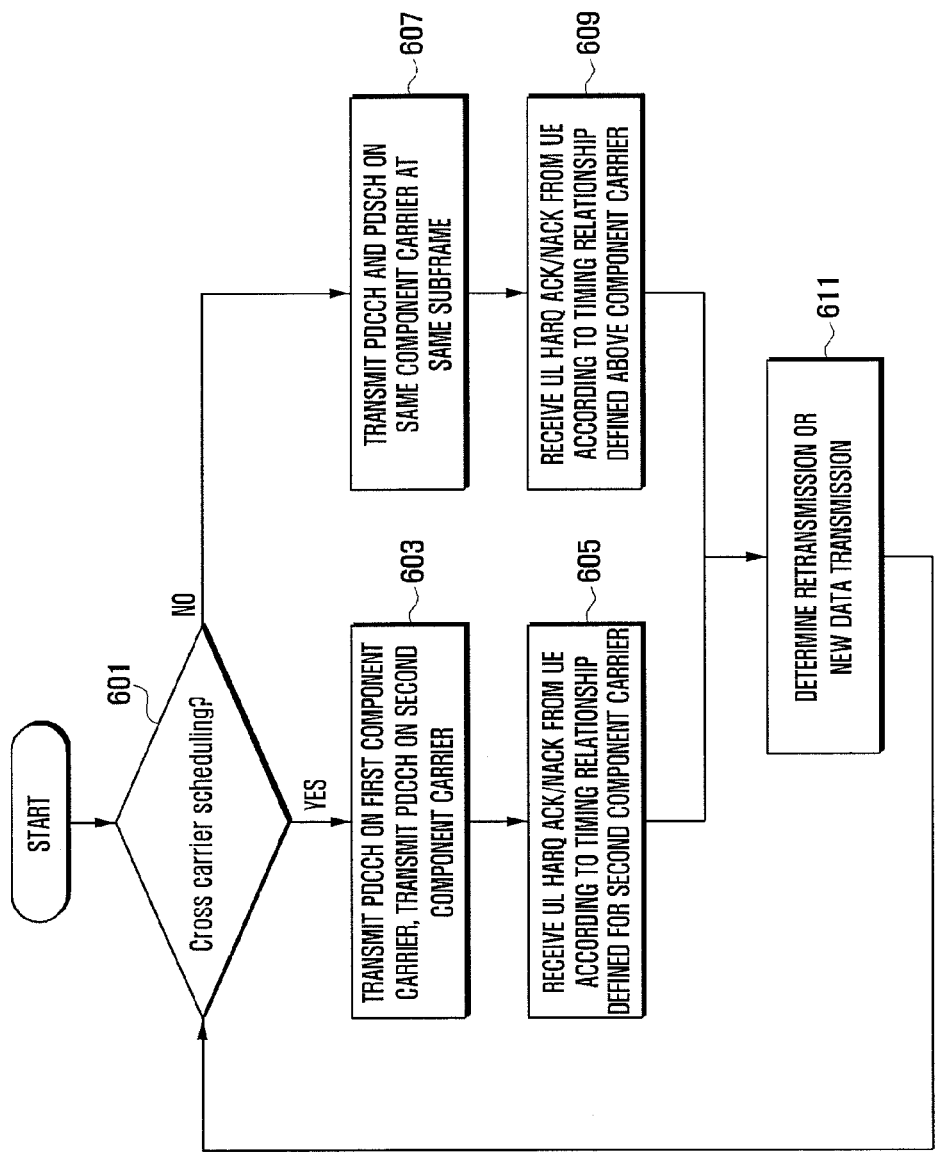
FIG. 6 is a flowchart illustrating the eNB procedure according to the first embodiment of the present invention.

FIG. 6 shows an eNB procedure according to the first embodiment. In order to transmit data to the UE, the eNB determines whether to perform cross-carrier scheduling at step 601. If it is determined not to perform cross-carrier scheduling, the eNB generates and transmits PDCCH and PDSCH to the UE on the same component carrier at the same subframe at step 607. The eNB receives uplink HARQ ACK/NACK from the UE according to the timing relationship between the PDSCH and uplink HARQ ACK/NACK defined in the legacy LTE system for the component carrier at step 609. If it is determined to perform cross-carrier scheduling at step 601, the eNB generates and transmits PDCCH on the first component carrier and generates and transmits PDSCH on the second component carrier. At this time, the PDCCH and PDSCH transmission timings are determined according to one of the methods A and B. The eNB and UE use one of the methods A and B which is agreed in advance through negotiation. The eNB receives the uplink HARQ ACK/NACK from the UE according to the timing relationship between the PDSCH and uplink HARQ ACK/NACK which is defined in the legacy LTE system for the second component carrier on which the PDSCH has been transmitted at step 605. If the HARQ ACK/NACK received at step 609 or 605 indicates NACK, the eNB performs retransmission of the PDSCH and, otherwise if ACK, transmits new PDSCH. The eNB returns the procedure to step 601 to determine whether to perform the cross-carrier scheduling for PDSCH retransmission or new PDSCH transmission and continues the rest steps according to the determination result.

Figure 7:
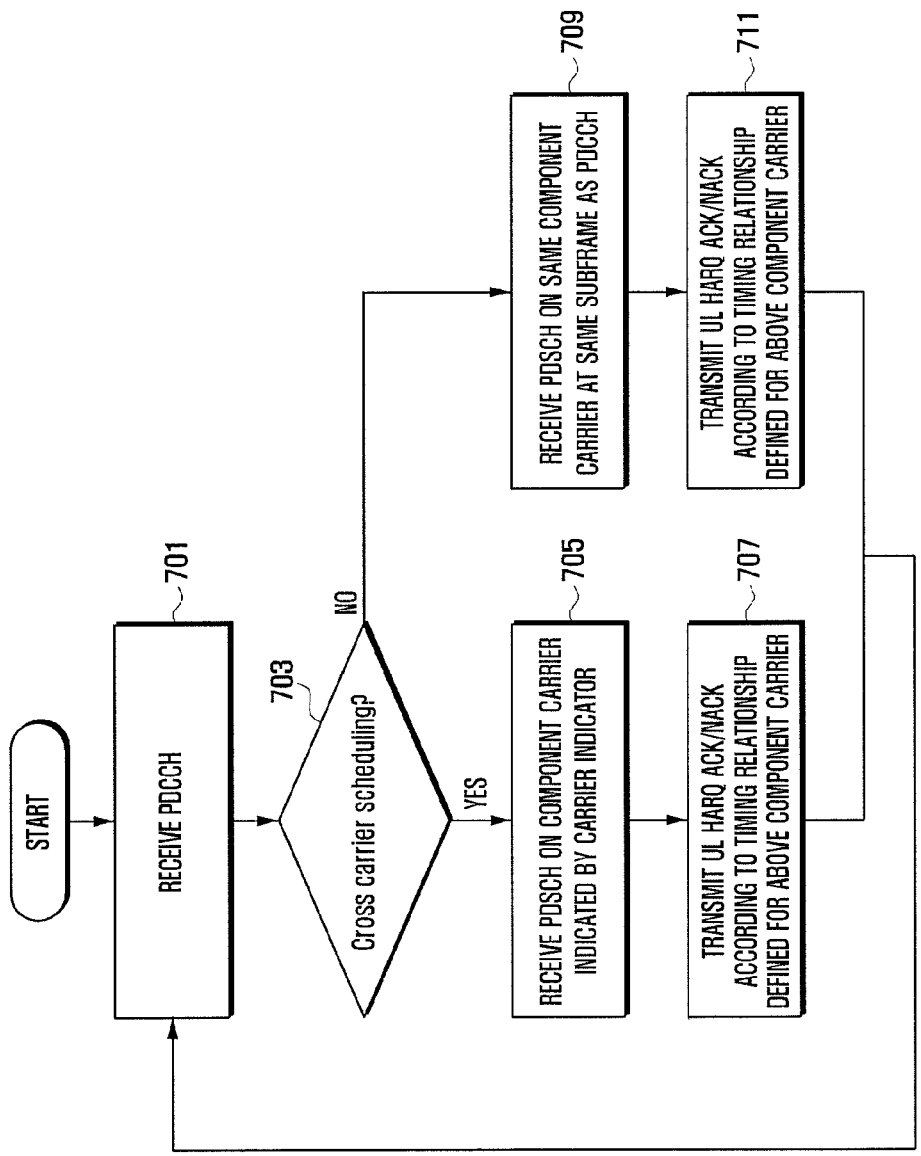
FIG. 7 is a flowchart illustrating the UE procedure according to the first embodiment of the present invention.

FIG. 7 is a UE procedure according to the first embodiment. The UE receives PDCCH from the eNB at step 701. Since it is impossible to know the timing when and the component carrier on which the eNB transmits the PDCCH, the UE attempts detecting PDCCH on all aggregated component carrier at every subframe. The UE performs CRC with unique UE-ID allocated to itself on the PDCCH and, if the PDCCH carries the scheduling information on it, determines whether the scheduling information is the cross-carrier scheduling information at step 703. If the carrier indicator (CI) included in the PDCCH indicates the component carrier on which the PDCCH has been transmitted at step 703, the UE determines that the cross-carrier scheduling is not applied and thus the procedure goes to step 709. At step 709, the UE receives PDSCH at the subframe on the component carrier on which the PDCCH has been transmitted. The UE transmits uplink HARQ ACK/NACK according to the timing relationship between the PDSCH and uplink HARQ ACK/NACK defined in the legacy LTE system for the component carrier identified at step 709. If the CI included in the PDCCH indicates a component carrier different form the component carrier on which the PDCCH has been transmitted, the UE determines that cross-carrier scheduling is applied and thus the procedure goes to step 705. At step 705, the UE receives PDSCH on the second component carrier indicated by the CI. Here, the PDSCH reception timing is determined according to one of the methods A and B. The eNB and UE selects one of the methods A and B through negotiation in advance. The UE transmits uplink HARQ ACK/ACK according to the timing relationship between the PDSCH and uplink HARQ ACK/NACK defined in the legacy LTE system for the second component carrier on which the PDSCH has been received at step 707. The UE returns the procedure to step 701 after step 707 or 711 and, if the HARQ ACK/ACK indicates NACK, prepares receipt of the PDSCH retransmission and, otherwise if ACK, prepares receipt of new PDSCH.

The first embodiment may be modified in various ways. For example, unlike the methods A and B, it is possible to designate the subframe for carrying PDSCH on the second component carrier which is cross-carrier scheduled by the PDCCH with n-bit subframe indicator. In case of using 2-bit subframe indicator, the PDCCH including the subframe indicator set to 00 indicates cross-carrier scheduling for the PDSCH at the downlink subframe of the second component carrier which arrives first since the PDCCH transmission timing, the PDCCH including the subframe indicator set to 01 indicates cross-carrier scheduling for the PDSCH at the downlink subframe of the second component carrier which arrives second since the PDCCH transmission timing, the PDCCH including the subframe indicator set to 10 indicates cross-carrier scheduling for the PDSCH at the downlink subframe of the second component carrier which arrives third since the PDCCH transmission timing, and the PDCCH including the subframe indicator set to 11 indicates cross-carrier scheduling for the PDSCH at the downlink subframe of the second component carrier which arrives fourth since the PDCCH transmission timing.

Second Embodiment

The second embodiment describes another method for defining timing relationship among PDCCH, PDSCH, and UL HARQ ACK/NACK in association with downlink data transmission in the TDD radio communication system supporting carrier aggregation when the aggregated carriers are configured with different TDD uplink-downlink configurations.

The description is made in detail hereinafter with reference to the example of FIG. 8.

Figure 8:
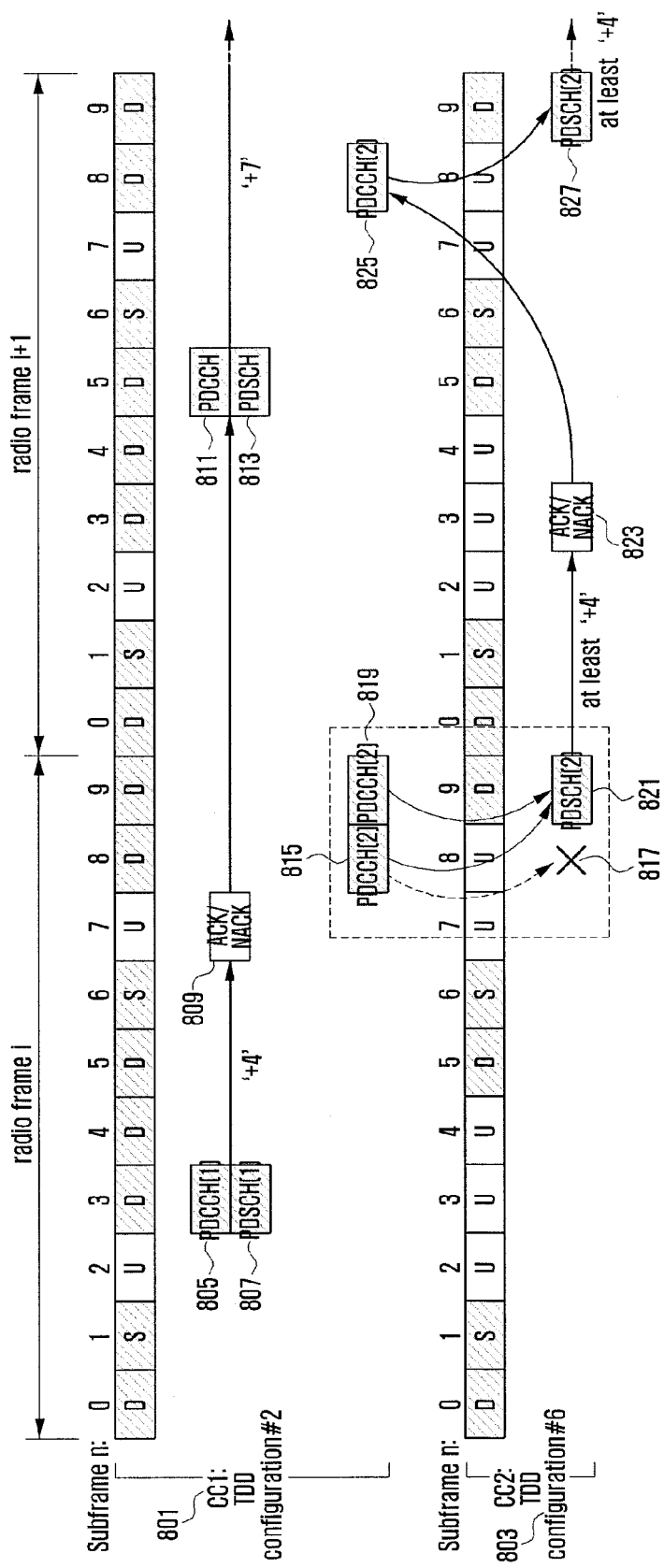
FIG. 8 is a diagram illustrating the timing relationship between PDSCH and uplink HARQ ACK/NACK according to the second embodiment of the present invention.

FIG. 8 shows an example of the TDD system operating with two aggregated component carriers: CC1 801 with TDD uplink-downlink configurations #2 and CC2 803 with TDD uplink-downlink configuration #6. Although FIG. 8 is directed to the example in which CC1 and CC2 have the same frame timing, the present invention is applicable to the cases where the radio framing timings of the component carriers mismatch with each other.

In FIG. 8, the PDSCH scheduling operation on the CC1, i.e. the operation ruled out the cross-carrier scheduling, is identical with that in the legacy LTE TDD system. Accordingly, detailed description thereon is omitted herein as in the first embodiment of FIG. 5.

In the second embodiment, a procedure for scheduling the PDSCH of CC2 by the PDCCH of CC1, i.e. cross-carrier scheduling procedure, is defined with some difference from the first embodiment.

The timing relationship between PDCCH carrying the cross-carrier scheduling information and the scheduled PDSCH are defined with the methods A and B as described in the first embodiment.

In the example of FIG. 8, the eNB is to transmit PDCCH 815 scheduling PDSCH of CC2 at subframe #8 of the ith radio frame which is configured as a downlink subframe on the CC1. That is, this is the case where the CC1 operates as the first component carrier and the CC2 operates as the second component carrier. However, since the subframe of the CC2 is configured as an uplink subframe at the same timing, the eNB cannot perform downlink transmission at the corresponding subframe as denoted by reference number 817. In order to solve this problem, the method A is to transmit the PDCCH 819 for cross-carrier scheduling and the scheduled PDSCH 821 on the respective component carriers CC1 and CC2 simultaneously at the subframe #9 of the ith radio frame which is the first downlink subframe, on both the CC1 and CC2, arriving after the subframe #8 of the ith radio frame. Another method B is to transmit the PDCCH 815 for cross-carrier scheduling the PDSCH on the CC2 at the subframe #8 of the ith radio frame on the CC1 and then transmit the PDSCH 821 at the subframe #9 of the ith radio frame which is the downlink subframe arrives first after the subframe #8 of the ith radio frame on the CC2.

The second embodiment defines the uplink HARQ ACK/NACK transmission timing corresponding to the PDSCH 821 in different way from the first embodiment. That is, the UE does not follow the timing relationship according to the TDD uplink-downlink configuration #6 of the CC2 carrying the PDSCH 821 which is defined for the legacy LTE system but transmits the uplink HARQ ACK/NACK at the uplink subframe of the CC2 which arrives first after at least j subframes since the subframe at which the PDSCH 821 is received. Here, j is set to a value large enough for guaranteeing the minimum signal processing time of the UE, i.e. 4 subframes in general. Accordingly, in the example of FIG. 8, the uplink HARQ ACK/NACK 823 is transmitted at the subframe #3 of the $(i+1)^{th}$ radio frame.

If it is determined that the uplink HARQ ACK/NACK 823 indicates NACK, the eNB determines whether to perform cross-carrier scheduling for PDSCH retransmission. However, the PDSCH retransmission is performed on the same component carrier as the initial transmission of the PDSCH. In case of cross-carrier scheduling the PDSCH retransmission, the eNB schedules the PDSCH retransmission at the downlink subframe of the CC1 which arrives after at least j subframes since the subframe at which the HARQ ACK/NACK 823 has been received. As aforementioned, since the downlink HARQ is asynchronous HARQ, the PDCCH for scheduling the PDSCH retransmission is possible at any downlink subframe after at least j subframes since subframe carrying the uplink HARQ ACK/NACK 823. FIG. 8 shows the exemplary case in which the eNB transmits the PDCCH 825 at the subframe #8 of the $(i+1)^{th}$ radio frame which is the downlink subframe of the CC1 which arrives after 4 subframes since the receipt of the uplink HARQ ACK/NACK 823. At this time, since the CC2 is of uplink subframe at the timing when the PDCCH 825 is transmitted in downlink on the CC1, the eNB cannot perform PDSCH retransmission. According to method B, the eNB performs PDSCH retransmission 827 on the CC2 at the subframe #9 of the $(i+1)^{th}$ radio frame.

Summering the second embodiment, the timing relationship between PDCCH carrying the cross-carrier scheduling information and the scheduled PDSCH is determined based on one of methods A and B. The timing relationship between the PDSCH which the UE receives form the eNB and the HARQ ACK/NACK which the UE transmits in uplink is determined in such a way that the uplink HARQ ACK/NACK is transmitted at the uplink subframe of the second component carrier which arrives first after at least j subframes since the subframe at which the PDSCH has been received regardless of the TDD uplink-downlink configuration applied to the second component carrier.

Figure 9:
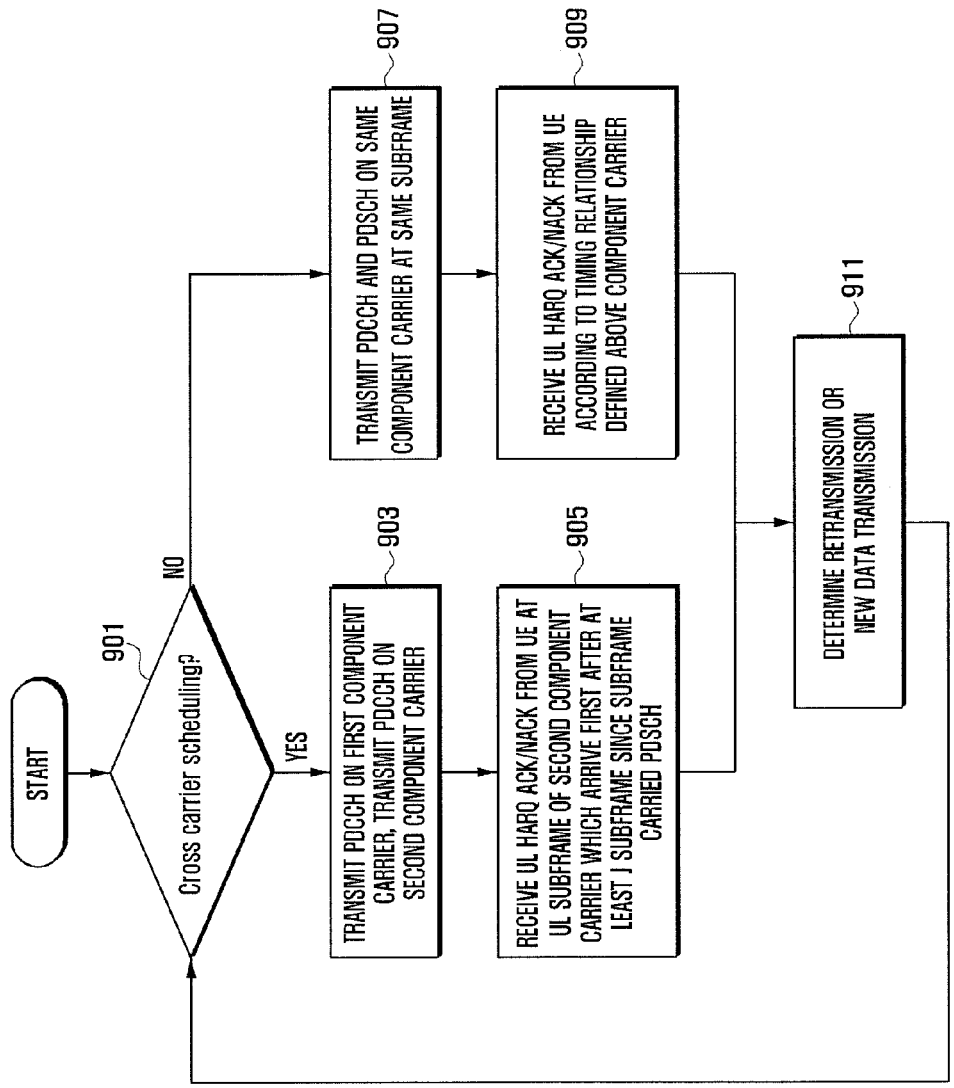
FIG. 9 is a flowchart illustrating the eNB procedure according to the second embodiment of the present invention.

FIG. 9 is shows the eNB procedure according to the second embodiment. In order to transmit data to a UE, the eNB determines whether to perform cross-carrier scheduling at step 901. If it is determined not to perform cross-carrier scheduling, the eNB generates PDCCH and PDSCH and transmits the PDCCH and PDSCH to the UE on the same component carrier and at the same subframe at step 907. The eNB receives uplink HARQ ACK/NACK from the UE according to the timing relationship between the PDSCH and uplink HARQ ACK/NACK which is applied to the component carrier carrying the PDCCH and PDSCH (step 907) as defined in the legacy LTE system at step 909. If it is determined to perform cross-carrier scheduling at step 901, the eNB generates and transmits PDCCH on the first component carrier and generates and transmits PDSCH on the second component carrier at step 903. At this time, the PDCCH and PDSCH transmission timings are determined according to one of the methods A and B. The method to be used for determining the PDCCH and PDSCH transmission timings are agreed between the eNB and the UE in advance. The eNB receives uplink ACK/NACK at the uplink subframe of the second component carrier arriving first after at least j subframes since the subframe at which the PDSCH has been transmitted regardless of the timing relationship between the PDSCH and uplink HARQ ACK/NACK applied to the second component as defined in legacy LTE system. Here, j is set to a value large enough for guaranteeing the minimum signal procession time of the UE, 4 subframes in general. If the HARQ ACK/NACK received at steps 909 or 905 indicates NACK, the eNB performs PDSCH retransmission and, otherwise, new PDSCH transmission. Afterward, the eNB returns the procedure to step 901 to determine whether to perform cross-carrier scheduling for the PDSCH retransmission or new PDSCH transmission and continues the procedure according to the determination result.

Figure 10:
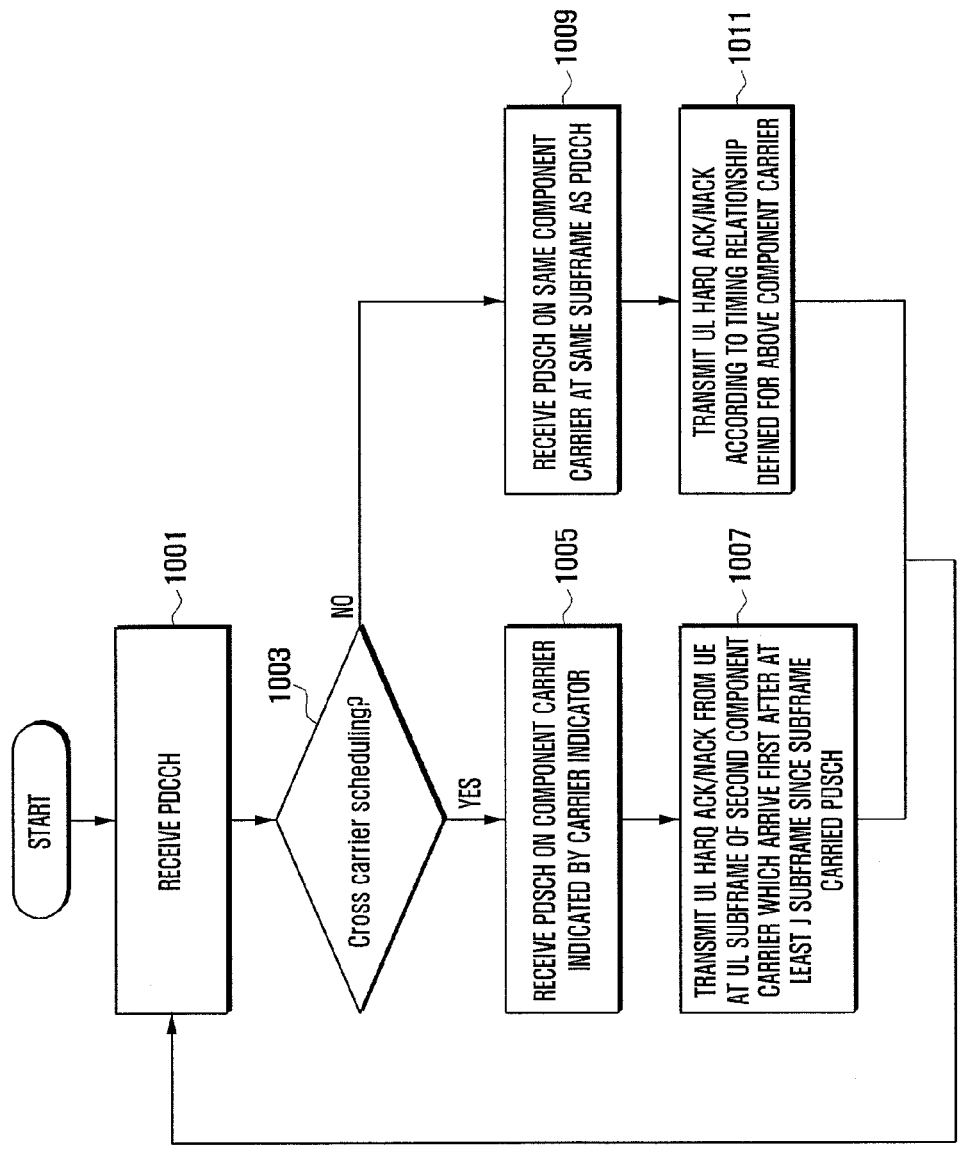
FIG. 10 is a flowchart illustrating the UE procedure according to the second embodiment of the present invention.

FIG. 10 shows the UE procedure according to the second embodiment. The UE receives PDCCH from the eNB at step 1001. Since the UE has no information on the time and PDCCH on which the eNB transmits the PDCCH, it attempts detecting PDCCH on every aggregated component carrier at every subframe. The UE performs CRC on the received PDCCH with unique UE-ID allocated to it and, if the PDCCH carries the scheduling information for the UE, determines whether cross-carrier scheduling has been applied at step 1003. At step 1003, if the carrier indicator (CI) included in the PDCCH indicates the component carrier on which the PDCCH has been transmitted, the UE determines that no cross-carrier scheduling has been applied and thus the procedure goes to step 1009. At step 1009, the UE receives PDSCH at the same subframe where the PDCCH is received. The UE transmits uplink HARQ ACK/NACK according to the timing relationship between the PDCCH and uplink HARQ ACK/NACK according to the TDD uplink-downlink configuration applied to the component carrier carrying both the PDCCH and PDSCH as defined in the legacy LTE system at step 1011. If the CI included in the PDCCH indicates a component carrier different from the one on which the PDCCH has been transmitted at step 1003, the UE determines that the cross-carrier scheduling has been applied and thus the procedure goes to step 1005. At step 1005, the UE receives the PDSCH on the second component carrier indicated by the CI. The PDSCH reception timing is determined according to one of methods A and B. The method to be used for determining the PDCCH and PDSCH transmission timings are agreed between the eNB and the UE in advance. The UE transmits uplink HARQ ACK/NACK at the uplink subframe of the second component carrier which arrives first after least j subframes since the subframe on which the PDSCH has been received regardless of the timing relationship between the PDSCH and uplink HARQ ACK/NACK of the TDD uplink-downlink configuration applied to the second component carrier as defined for the legacy LTE system.

The second embodiment can be modified in various ways. For example, unlike the methods A and B, it is possible to designate the subframe for carrying PDSCH on the second component carrier which is cross-carrier scheduled by the PDCCH. For example, it is possible to add an n-bit subframe indicator to the PDCCH to map with the subframe of the PDSCH scheduled by the PDCCH. That is, when using the 2-bit subframe indicator, In case of using 2-bit subframe indicator, the PDCCH including the subframe indicator set to 00 indicates cross-carrier scheduling for the PDSCH at the downlink subframe of the second component carrier which arrives first since the PDCCH transmission timing, the PDCCH including the subframe indicator set to 01 indicates cross-carrier scheduling for the PDSCH at the downlink subframe of the second component carrier which arrives second since the PDCCH transmission timing, the PDCCH including the subframe indicator set to 10 indicates cross-carrier scheduling for the PDSCH at the downlink subframe of the second component carrier which arrives third since the PDCCH transmission timing, and the PDCCH including the subframe indicator set to 11 indicates cross-carrier scheduling for the PDSCH at the downlink subframe of the second component carrier which arrives fourth since the PDCCH transmission timing.

Third Embodiment

The third embodiment describes a method for defining timing relationship among PDCCH, PUSCH, and PHICH in association with uplink data transmission in the TDD radio communication system securing broad bandwidth through carrier aggregation especially when the aggregated carriers are configured with different TDD uplink-downlink configurations.

The description is made in detail hereinafter with reference to the example of FIG. 11.

Figure 11:
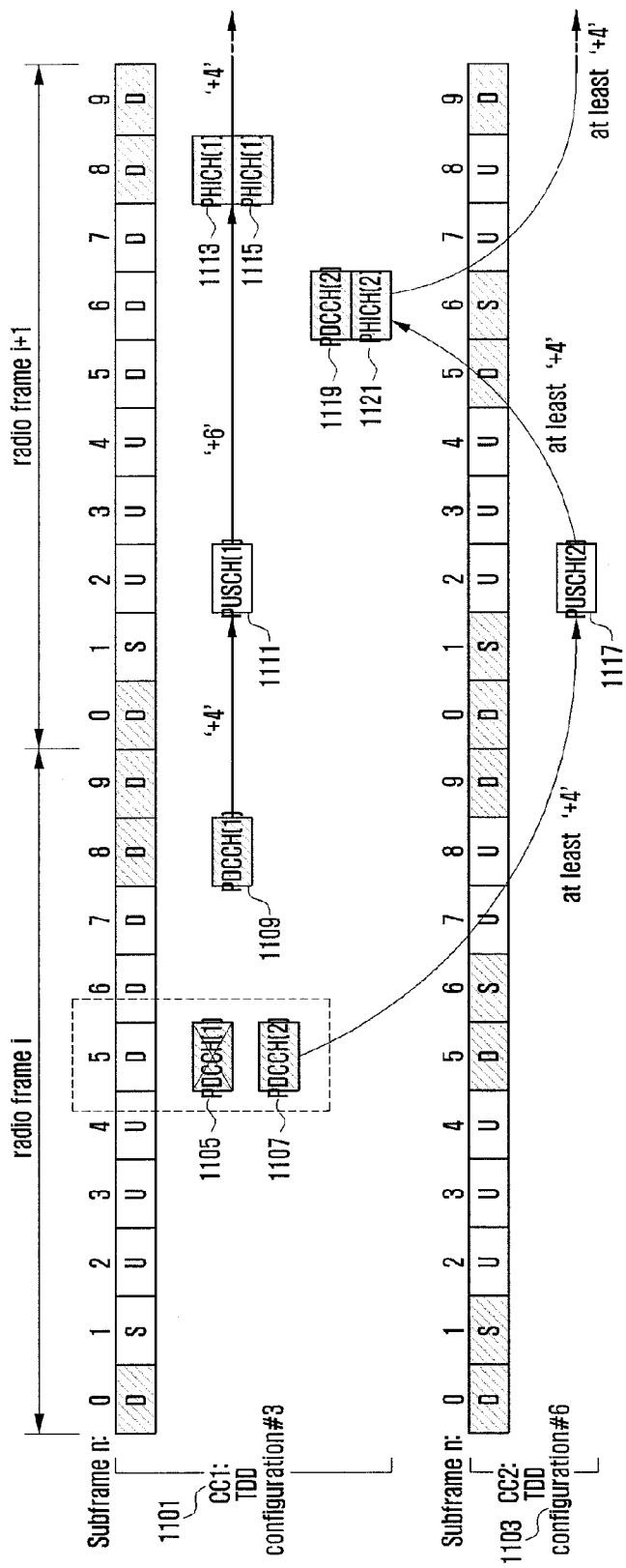
FIG. 11 is a diagram illustrating the timing relationship among PDCCH, PUCCH, and PHICH according to the third embodiment of the present invention.

FIG. 11 shows an example of the TDD system operating with two aggregated component carriers: CC1 1101 with TDD uplink-downlink configuration #3 and CC2 1103 with TDD uplink-downlink configuration #6. Although FIG. 11 is directed to the example in which CC1 and CC2 have the same frame timing, the present invention is applicable to the cases where the radio framing timings of the component carriers mismatch with each other.

The LTE system adopts synchronous HARQ having the fixed data transmission timing in uplink. Accordingly, the uplink/downlink timing relationship among the PUSCH, PDCCH followed by the PUSCH, and the PHICH carrying downlink HARQ ACK/NACK corresponding to the PUSCH has to be fixed according to a predetermined rule.

In the LTE TDD system, the minimum signal processing time of the eNB or UE is secured in association with PUSCH transmission in such a way that the downlink transmission of the PDCCH corresponding to the PUSCH or the PHICH is restricted to specific downlink subframe according to a TDD uplink-downlink configuration. For example, in case of the TDD uplink-downlink configuration #3 of FIG. 11, the downlink transmission of the PDCCH for scheduling the PUSCH or the PHICH corresponding to the PUSCH is muted at the subframes #1, #5, #6, and #7. In case of the TDD uplink-downlink configuration #6, the above restriction is not applied to any subframe.

In FIG. 11, the PDSCH scheduling operation on the CC1, i.e. the operation ruled out the cross-carrier scheduling, is identical with that in the legacy LTE TDD system. For example, the eNB transmits the PDCCH 1109 for scheduling PUSCH 1111 of CC1 on the CC1 carrying the PUSCH 1111 at the subframe #8 of the ith radio frame which is configured as a downlink subframe. The UE transmits the PUSCH 1111 at the subframe #2 of the $(i+1)^{th}$ radio frame after four subframes since the receipt of the PDCCH 1109 according to the timing relationship of the TDD uplink-downlink configuration #3 defined in table 4. Afterward, the eNB generates HARQ ACK/NACK corresponding to the PUSCH 1111 transmitted by the UE and transmits it in the PHICH 1113 at the subframe #8 of the $(i+1)^{th}$ radio frame after 6 subframes since the subframe on which the PUSCH 1111 has been received according to the timing relationship of the TDD uplink-downlink configuration #3 defined in table 5. In case of scheduling the PUSCH retransmission, the PDCCH 1115 including the scheduling information is transmitted at the same subframe as the PHICH 1113.

As described above, since the transmission of PUSCH for scheduling PUSCH and the PHICH corresponding to the PUSCH is restricted at the subframes #1, #5, #6, and #7 in the TDD uplink-downlink configuration #3, it is impossible to transmit the PDCCH 1105 for scheduling PUSCH on the CC1 at the subframe #5 of the ith radio frame.

The operation for scheduling PUSCH of CC2 by PDCCH of CC1, i.e. the cross-carrier scheduling operation, is need to be defined newly for covering the operations that are not shown in the legacy LTE system. In more detail, the PDCCH, PUSCH, and PHICH transmission related to uplink data transmission are not limited to specific component carrier but performed in order of PDCCH transmission to the eNB on the first component carrier, PUSCH transmission to the UE on the second component carrier, and PHICH transmission to the eNB on the first component carrier in the cross carrier, scheduling such that it is difficult to apply the timing relationship designed for the legacy LTE system under the assumption of one component carrier.

First, the timing relationship between PDCCH carrying cross-carrier scheduling information and PUSCH scheduled by the PDCCH is defined.

In the example of FIG. 11, the eNB is to transmit PDCCH 1107 for scheduling PUSCH of CC2 at the subframe #5 of the ith radio frame which is configured as downlink subframe on the CC1. That is, this is the case where the CC1 operates as the first component carrier and the CC2 operates as the second component carrier. In this case, the subframe #5 of the ith radio frame on the CC1 is the subframe at which PDCCH transmission is restricted according to the TDD uplink-downlink configuration #3 applied to the CC1 as described above. However, the transmission of the PDCCH for scheduling the PUSCH of the CC2 through cross-carrier scheduling is permitted even at the restricted subframes on the CC1 so as to secure flexibility of the cross-carrier scheduling.

The UE transmits the PUSCH 1117 at the uplink subframe of the CC2 which arrives first after at least j subframes since the subframe on which the PDCCH 1107 has been received regardless of the timing relationship of the TDD uplink-downlink configuration #6 applied to the CC2 on which the PDCCH 1101 has been received as defined in the legacy LTE system. Here, j is set to a value large enough for guaranteeing the minimum signal processing time of the UE, i.e. 4 subframes in general. Accordingly, in the example of FIG. 11, transmits the PUSCH 1117 at the subframe #2 of the $(i+1)^{th}$ radio frame which is the uplink subframe arriving first after 4 subframes since the receipt of the PDCCH 1107 on the CC2.

If the PUSCH 1117 is received, the eNB determines whether to transmit ACK or NACK and feeds back the determination result to the UE through PHICH. In case of NACK, then eNB transmits the PDCCH for scheduling the PUSCH at the same subframe as the PHICH to the UE. At this time, the eNB determines whether to perform cross-carrier scheduling. However, the PUSCH retransmission is performed on the same component carrier as the initial transmission of the PUSCH. In case of applying the cross-carrier scheduling for PUSCH retransmission, the eNB transmit both the PHICH and PDCCH at the downlink subframe of the CC1 which arrives first after at least j subframes since the subframe on which the PUSCH 1117 has been received so as to secure the minimum signal processing time of the eNB. FIG. 11 shows the exemplary case in which the eNB transmits the PHICH 1121 and PDCCH 1119 at the subframe #6 of the $(i+1)^{th}$ radio frame on the CC1 which is the downlink subframe arriving first after 4 subframes since the receipt of the PUSCH 1117.

Summarizing the procedure of the third embodiment, first, although the PDCCH and PHICH transmissions are restricted at a specific subframe on the first component carrier according to the legacy LTE system rule, the PDCCH transmission for cross-carrier scheduling and the PHICH transmission on the second component carrier are permitted at the restricted subframe. Second, the timing relationship between the PDCCH carrying the carrier scheduling information on the first component carrier and the PUSCH to be transmitted by the UE on the second component carrier is configured such that the UE transmits the PUSCH at the uplink subframe of the second component carrier which arrives first after at least j subframes since the subframe on which the PDCCH has been received. Third, the timing relationship between the PUSCH transmitted on the second component carrier and the PHICH transmitted on the first component carrier in correspondence to the PUSCH is configured such that the eNB transmits the PHICH and PDCCH at the downlink subframe of the first component carrier which arrives first after at least j subframes since the subframe on which the PUSCH has been received.

Figure 12:
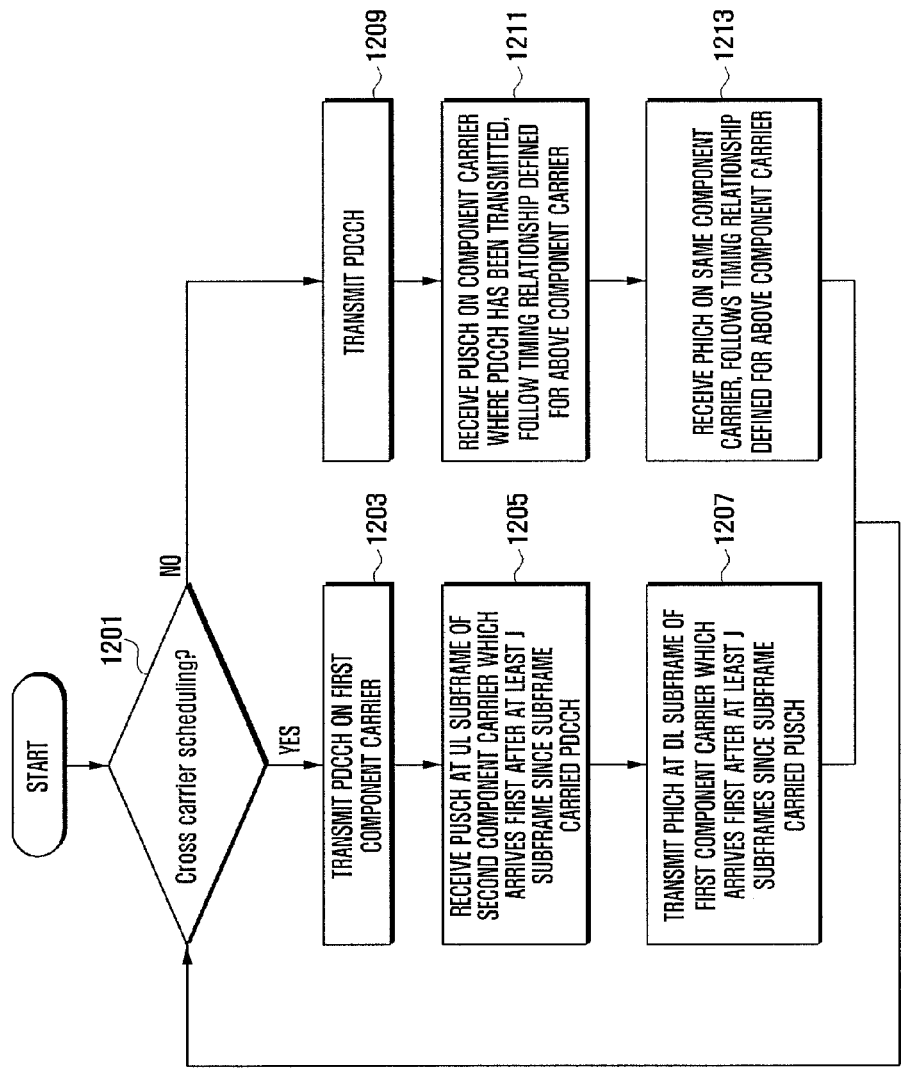
FIG. 12 is a flowchart illustrating the eNB procedure according to the third embodiment of the present invention.

FIG. 12 shows the eNB procedure according to the third embodiment. In order to transmit data to a UE, the eNB determines whether to perform cross-carrier scheduling at step 1201. If it is determined not to perform cross-carrier scheduling, the eNB generates and transmits PDCCH at step 1209. The eNB receives the PUSCH on the same component carrier as the PDCCH according to the timing relationship between the PDCCH and PUSCH which is applied to the component carrier of step 1209 as defined in the legacy LTE system at step 1211. The eNB transmits PHICH on the same component carrier according to the timing relationship between PUSCH and PHICH which is applied to the component carrier of steps 1209 and 1211 as defined in the legacy LTE system at step 1213.

If it is determined to perform cross-carrier scheduling at step 1201, the eNB generates and transits PDCCH on the first component carrier at step 1203. In this case, although it is the subframe at which PDCCH transmission is restricted on the first component carrier according to the rule of the legacy LTE system, the PDCCH for the cross-carrier scheduling on the second component carrier is permitted to be transmitted at the same subframe. The eNB receives the PUSCH at the uplink subframe of the second component carrier which arrives first after at least j subframes since the subframe on which the PDCCH has been transmitted at step 1205. Here, j is set to a value large enough for guaranteeing the minimum signal procession time of the UE, 4 subframes in general. The eNB transmits PHICH at the downlink subframe of the first component carrier which arrives after at least j subframes since the subframe at which the PUSCH has been received.

If the PHICH transmitted at step 1207 or 1213 carries NACK, the PUSCH retransmission is triggered and, otherwise if ACK, new PUSCH transmission is triggered. Afterward, the eNB returns the procedure to step 1201 to determine whether to perform cross-carrier scheduling on the PUSCH retransmission or the new PUSCH transmission and continues the procedures according to the determination result. At this time, the PDCCH for scheduling the PUSCH retransmission is transmitted on the same component carrier and at the same subframe as the PHICH transmitted at step 1207 or 1213.

Figure 13:
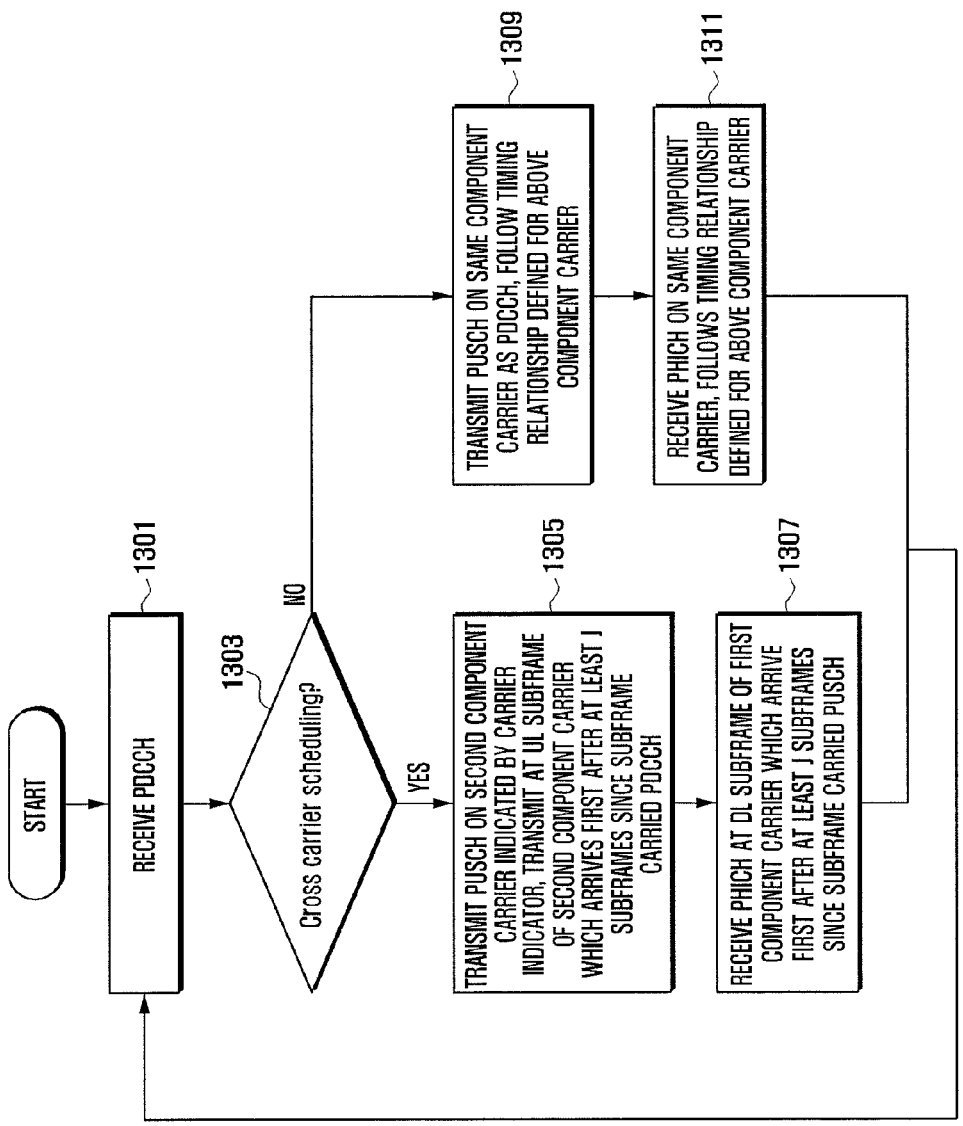
FIG. 13 is a flowchart illustrating the UE procedure according to the third embodiment of the present invention.

FIG. 13 shows the UE procedure according to the third embodiment. The UE receives PDCCH from the eNB at step 1301. Since the UE has no information on the time and PDCCH on which the eNB transmits the PDCCH, it attempts detecting PDCCH on every aggregated component carrier at every subframe. The UE performs CRC on the received PDCCH with unique UE-ID allocated to it and, if the PDCCH carries the scheduling information for the UE, determines whether cross-carrier scheduling has been applied at step 1303. At step 1303, if the carrier indicator (CI) included in the PDCCH indicates the component carrier on which the PDCCH has been transmitted, the UE determines that no cross-carrier scheduling has been applied and thus the procedure goes to step 1309. At step 1309, the UE transmits PUSCH according to the timing relationship between PDCCH and PUSCH which is applied to the component carrier on which the PDCCH has been transmitted as defined in the legacy LTE system. The UE receives the PHICH on the same component carrier according to the timing relationship between the PUSCH and PHICH which is applied to the component carrier of step 1309 as defined in the legacy LTE system at step 1311. If the CI included in the PDCCH indicates a component carrier different from the component carrier on which the PDCCH has been transmitted, the UE determines that cross-carrier scheduling has been applied and thus the procedure goes to step 1305. At step 1305, the UE transmits PUSCH on the second component carrier indicated by the CI. The UE transmits the PUSCH at the uplink subframe of the second component carrier which arrives first after at least j subframes since the subframe on which he PDCCH has been received. Here, j is set to a value large enough for guaranteeing the minimum signal processing time of the UE, i.e. 4 subframes in general. The UE receives the PHICH at the downlink subframe of the first component carrier which arrives first after at least j subframes since the subframe at which the PUSCH has transmitted at step 1307.

If the PHICH received at step 1307 or 1311 indicates HARQ NACK, the UE performs PUSCH retransmission and, otherwise, if ACK, new PUSCH transmission. Afterward, the UE returns the procedure to step 1301 to received PDCCH from the eNB and continue the procedure as described above. At this time, the UE receives the PDCCH for scheduling PUSCH retransmission on the same component carrier and at the same subframe where the PHICH has been transmitted at step 1307 or 1311.

The third embodiment can be modified in various ways. It is possible to designate the subframe for carrying PDSCH on the second component carrier which is cross-carrier scheduled by the PDCCH. For example, it is possible to add an n-bit subframe indicator to the PDCCH to map with the subframe of the PDSCH scheduled by the PDCCH. However, the subframe carrying PDCCH is configured to occur after at least j subframes as described above, That is, when using the 2-bit subframe indicator, in case of using 2-bit subframe indicator, the PDCCH including the subframe indicator set to 00 indicates cross-carrier scheduling for the PDSCH at the downlink subframe of the second component carrier which arrives first after at least j subframes since the PDCCH transmission timing, the PDCCH including the subframe indicator set to 01 indicates cross-carrier scheduling for the PDSCH at the downlink subframe of the second component carrier which arrives second after at least j subframes since the PDCCH transmission timing, the PDCCH including the subframe indicator set to 10 indicates cross-carrier scheduling for the PDSCH at the downlink subframe of the second component carrier which arrives third after at least j subframes since the PDCCH transmission timing, and the PDCCH including the subframe indicator set to 11 indicates cross-carrier scheduling for the PDSCH at the downlink subframe of the second component carrier which arrives fourth after at least j subframes since the PDCCH transmission timing.

Fourth Embodiment

The fourth embodiment describes another method for defining timing relationship among PDCCH, PUSCH, and PHICH in association with uplink data transmission in the TDD radio communication system securing broad bandwidth through carrier aggregation especially when the aggregated carriers are configured with different TDD uplink-downlink configurations.

Figure 14:
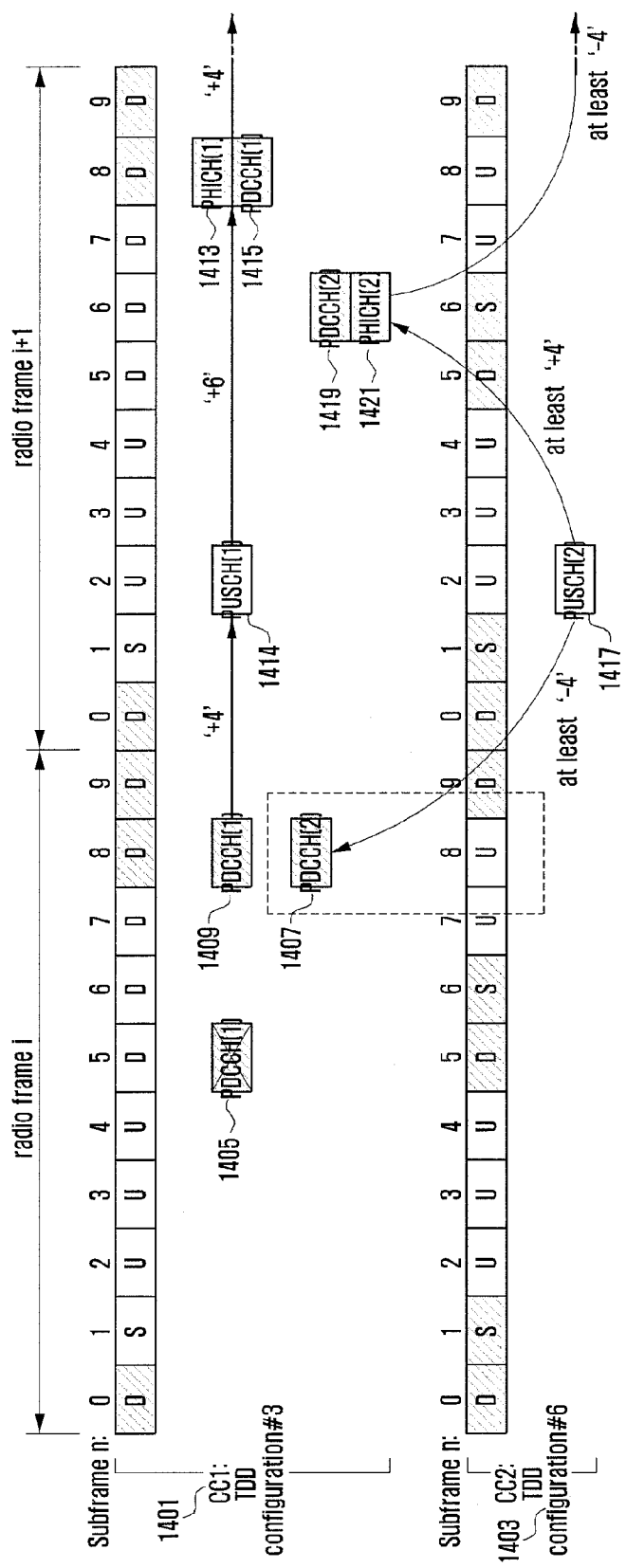
FIG. 14 is a diagram illustrating the timing relationship among PDCCH, PUSCH, and PHICH according to the fourth embodiment of the present invention.

The description is made in detail with reference to the example of FIG. 14.

FIG. 14 shows an example of the TDD system operating with two aggregated component carriers: CC1 1401 with TDD uplink-downlink configuration #3 and CC2 1403 with TDD uplink-downlink configuration #6. Although FIG. 14 is directed to the example in which CC1 and CC2 have the same frame timing, the present invention is applicable to the cases where the radio framing timings of the component carriers mismatch with each other.

As aforementioned, The LTE system adopts synchronous HARQ having the fixed data transmission timing in uplink. Accordingly, the uplink/downlink timing relationship among the PUSCH, PDCCH followed by the PUSCH, and the PHICH carrying downlink HARQ ACK/NACK corresponding to the PUSCH has to be fixed according to an predetermined rule.

In the LTE TDD system, the minimum signal processing time of the eNB or UE is secured in association with PUSCH transmission in such a way that the downlink transmission of the PDCCH corresponding to the PUSCH or the PHICH is restricted to specific downlink subframe according to a TDD uplink-downlink configuration. For example, in case of the TDD uplink-downlink configuration #3 of FIG. 14, the downlink transmission of the PDCCH for scheduling the PUSCH or the PHICH corresponding to the PUSCH is muted at the subframes #1, #5, #6, and #7. In case of the TDD uplink-downlink configuration #6, the above restriction is not applied to any subframe.

In FIG. 14, the PDSCH scheduling operation on the CC1, i.e. the operation ruled out the cross-carrier scheduling, is identical with that in the legacy LTE TDD system. Since this is identical with example of not performing cross-carrier scheduling in the third embodiment of FIG. 11, detailed description thereon is omitted herein.

In the fourth embodiment, the procedure for scheduling PUSCH of CC2 by the PDCCH of CC1, i.e. the cross-carrier scheduling procedure, is not specified in the legacy LTE standard and thus it is necessary to define such a cross-carrier scheduling operation newly. In cross-carrier scheduling, the PDCCH, PUSCH, and PHICH transmissions are not fixed on specific component carriers but performed in order of PDCCH transmission to the eNB on the first component carrier, PUSCH transmission to the UE in correspondence to the PDCCH on the second component carrier, and PHICH transmission to the eNB on the first component carrier, and thus it is difficult to apply the timing relationship designed under the assumption of the legacy LTE system using single component carrier.

The timing relationship between the PDCCH carrying the cross-carrier scheduling and the PUSCH in correspondence to the PDCCH is defined first.

In the example of FIG. 14, the eNB is to schedule the UE to transmit the PUSCH 1417 at the subframe #2 of the $(i+1)^{th}$ radio frame which is configured as an uplink subframe on the CC2. In this case, the eNB's transmission timing of the PDCCH for scheduling the PUSCH 1417 is determined such that the PDCCH is transmitted at the subframe nearest to the UE's PUSCH 1417 transmission timing among the downlink subframes on CC1 before at least j subframes preceding the transmission timing of the PUSCH 1417. Here, j is set to a value large enough for guaranteeing the minimum signal processing time of the UE, i.e. 4 subframes in general. Accordingly, in the example of FIG. 14, the eNB transmits the PDCCH 1407 at the subframe #8 of the ith radio frame which is nearest to the UE's PUSCH 1417 transmission timing among downlink subframes before 4 subframes preceding the transmission timing of the PUSCH 1417 on the CC2 which is to be scheduled by the eNB. Through this operation, it is possible to secure the time duration of at least j subframes between the PDCCH and PUSCH transmissions while maintaining the transmission interval to the least, resulting in improvement of eNB's scheduling efficiency.

If the PUSCH 1417 is received, the eNB determines whether to transmit ACK or NACK and feeds back the ACK or NACK to the UE through PHICH. In case of NACK, the eNB transmits the PDCCH for rescheduling the PUSCH to the UE along with the PHICH. At this time, the eNB determine whether to perform cross-carrier scheduling again. However, the PUSCH retransmission is performed on the same component carrier as the initial transmission of the PUSCH. In case that the cross-carrier scheduling is performed for the PUSCH retransmission, the eNB transmits the PHICH and PDCCH at the downlink subframe of CC1 which arrives first after at least j subframes since the subframe at which the PUSCH 1417 has been received, so as to secure its minimum signal processing time. FIG. 14 shows an example in which the eNB transmits the PHICH 1421 and PDCCH 1419 at the subframe #6 of the $(i+1)^{th}$ radio frame as a downlink subframe of the CC1 which arrives first after 4 subframes since the receipt of the PUSCH 1117. In this case, the subframe #6 of the $(i+1)^{th}$ radio frame on the CC1 corresponds to the subframe at which PDCCH and PHICH transmission is restricted according to the TDD uplink-downlink configuration #3 as aforementioned. Through cross-carrier scheduling, however, the PDCCH for scheduling PUSCH of the CC2 and the PHICH carrying HARQ ACK/NACK on the CC2 are permitted to be transmitted at the restricted subframe of the CC1 to secure flexibility of the cross-carrier scheduling.

Summarizing the procedure of the fourth embodiment, first, although the PDCCH and PHICH transmissions are restricted at a specific subframe on the first component carrier according to the legacy LTE system rule, the PDCCH transmission for cross-carrier scheduling and the PHICH transmission on the second component carrier are permitted at the restricted subframe. Second, the timing relationship between the PDCCH carrying the carrier scheduling information on the first component carrier and the PUSCH to be transmitted by the UE on the second component carrier is configured such that the eNB transmits the PDCCH at the subframe nearest to the PUSCH transmission timing among the downlink subframes of the first component carrier before at least j subframes proceeding the UE's PUSCH transmission timing. Third, the timing relationship between the PUSCH transmitted by the UE on the second component carrier and the PHICH transmitted by the eNB on the first component carrier in correspondence to the PUSCH is configured such that the eNB transmits PHICH and PDCCH at the downlink subframe of the first component carrier which arrives first after at least j subframes since the subframe at which the PUSCH has been received.

Figure 15:
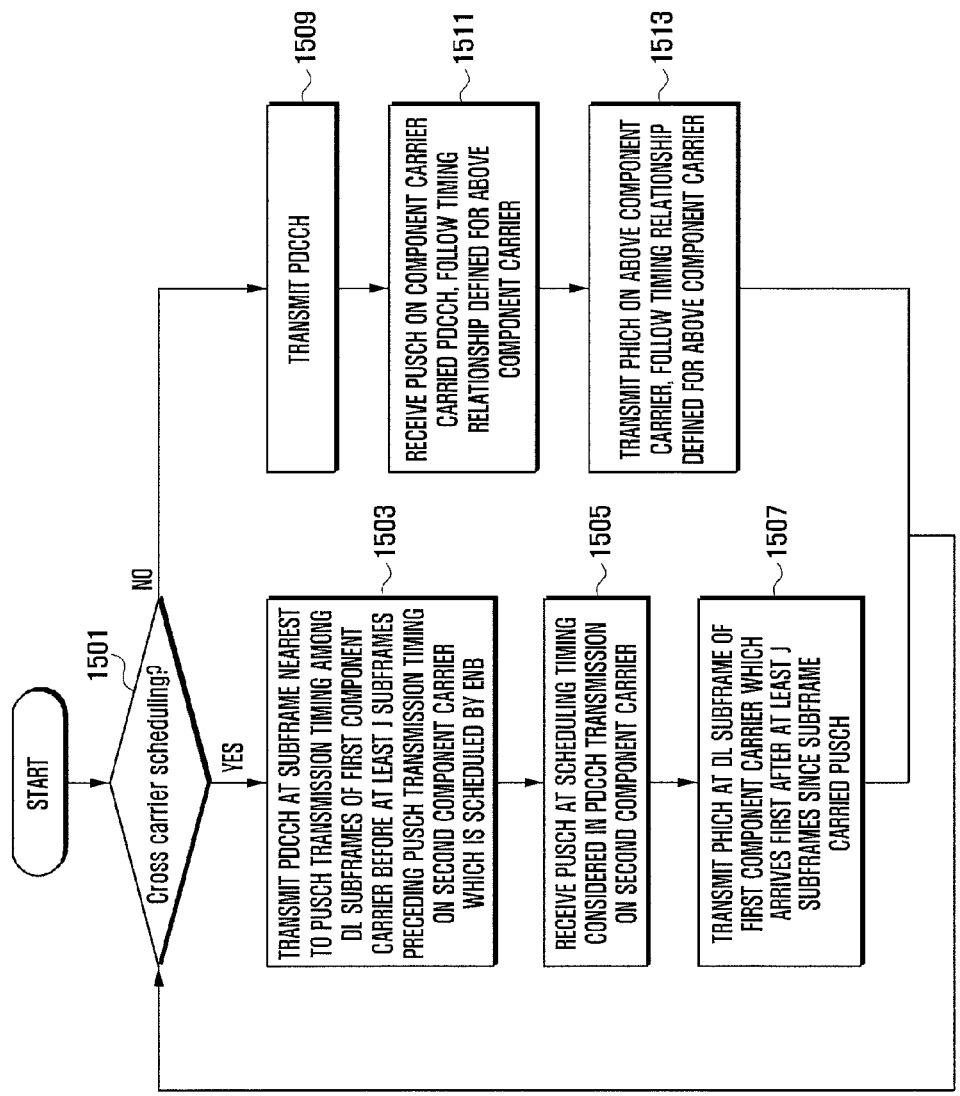
FIG. 15 is a flowchart illustrating the eNB procedure according to the fourth embodiment of the present invention.

FIG. 15 shows the eNB procedure according to the fourth embodiment. In order to transmit data to a UE, the eNB determines whether to perform cross-carrier scheduling at step at step 1501. If it is determined not to perform cross-carrier scheduling, the eNB generates and transmits PDCCH at step 1509. The eNB receives the PUSCH on the same component carrier as the PDCCH according to the timing relationship between the PDCCH and PUSCH which is applied to the component carrier of step 1509 as defined in the legacy LTE system at step 1511. The eNB transmits PHICH on the same component carrier according to the timing relationship between PUSCH and PHICH which is applied to the component carrier of steps 1509 and 1511 as defined in the legacy LTE system at step 1513.

If it is determined to perform cross-carrier scheduling at step 1501, the eNB generates and transits PDCCH on the first component carrier at step 1503. In this case, the eNB transmits the PDCCH at the subframe nearest to the UE's PUSCH transmission timing among the downlink subframes of the first component carrier before at least j subframes preceding the UE's PUSCH transmission timing on the second component carrier. Here, j is set to a value large enough for guaranteeing the minimum signal procession time of the UE, 4 subframes in general. Although it is the frame at which PDCCH transmission is restricted on the first component carrier according to the legacy LTE system rule, the PDCCH transmission for cross-carrier scheduling on the second component carrier is permitted at the restricted subframe on the first component carrier. The eNB receives PUSCH at the scheduled timing on the second component carrier at step 1050, the timing being determined in transmitting the PDCCH. the eNB transmits PHICH at the downlink subframe carrier of the first component carrier which arrives after at least j subframes since the subframe on which the PUSCH has been received.

If the PHICH transmitted at step 1507 or 1513 carries HARQ NACK, the eNB schedules the PUSCH retransmission and, otherwise if the PHICH carries HARQ ACK and if there is the data to be transmitted by the UE, new PUSCH transmission. Afterward, the eNB returns the procedure to step 1501 to determine whether to perform cross-carrier scheduling for the PUSCH retransmission or the new PUSCH transmission and continue the procedure according to the determination result. At this time, the PDCCH for scheduling the PUSCH retransmission is transmitted on the same component carrier at the same subframe as the PHICH.

Figure 16:
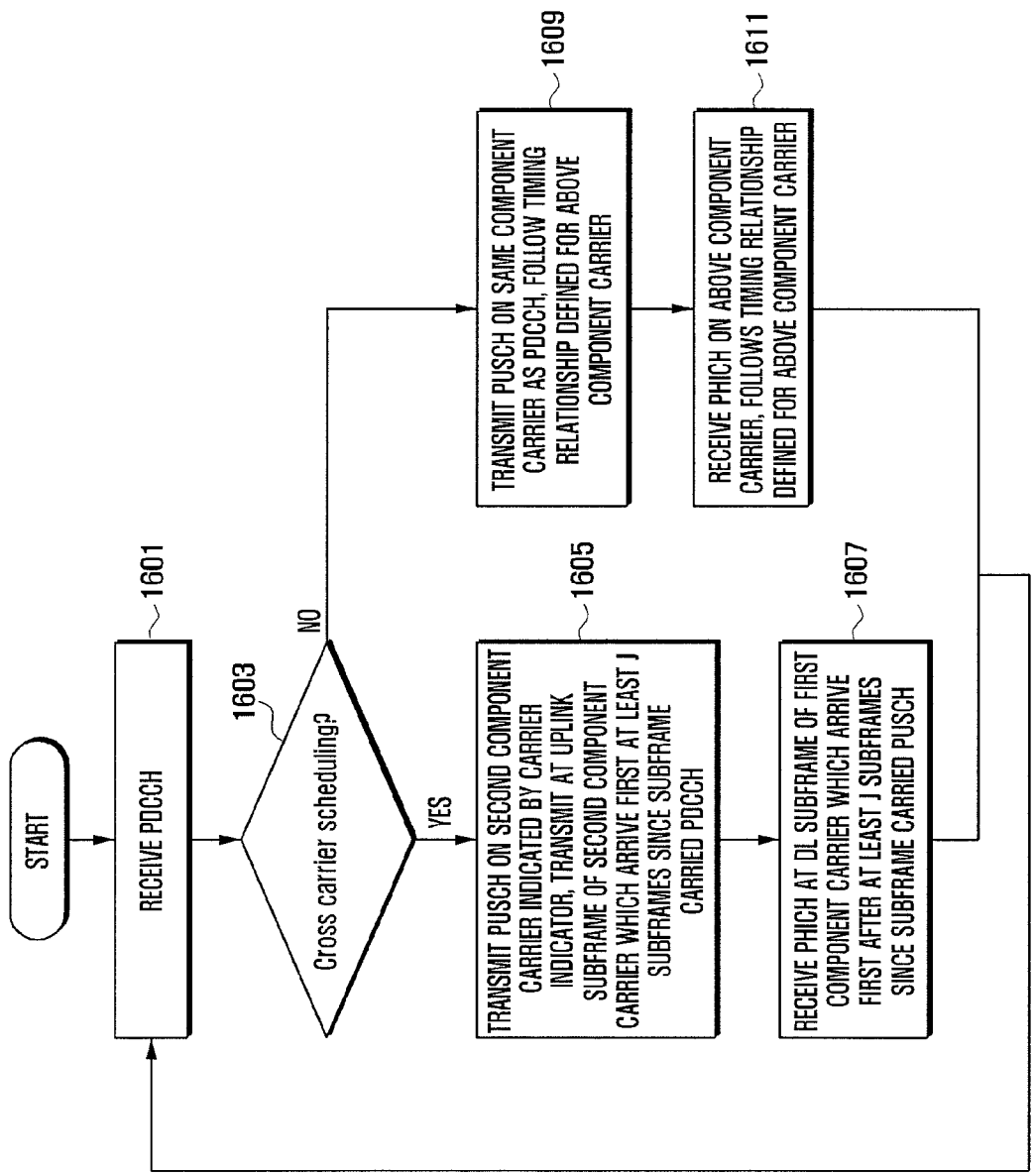
FIG. 16 is a flowchart illustrating the UE procedure according to the fourth embodiment of the present invention.

FIG. 16 shows the UE procedure according to the fourth embodiment. The UE receives PDCCH from the eNB at step 1601. Since the UE has no information on the time and PDCCH on which the eNB transmits the PDCCH, it attempts detecting PDCCH on every aggregated component carrier at every subframe. The UE performs CRC on the received PDCCH with unique UE-ID allocated to it and, if the PDCCH carries the scheduling information for the UE, determines whether cross-carrier scheduling has been applied at step 1603. At step 1303, if the carrier indicator included in the PDCCH indicates the component carrier on which the PDCCH has been transmitted, the UE determines that no cross-carrier scheduling has been applied and thus the procedure goes to step 1609. At step 1609, the UE transmits PUSCH according to the timing relationship between PDCCH and PUSCH which is applied to the component carrier on which the PDCCH has been transmitted according to the timing relationship between the PDCCH and PUSCH as defined in the legacy LTE system. The UE receives the PHICH on the same component carrier according to the timing relationship between the PUSCH and PHICH which is applied to the component carrier of step 1609 as defined in the legacy LTE system at step 1611. If the carrier indicator included in the PDCCH indicates a component carrier different from the component carrier on which the PDCCH has been transmitted, the UE determines that cross-carrier scheduling has been applied and thus the procedure goes to step 1605. At step 1605, the UE transmits PUSCH on the second component carrier indicated by the carrier indicator. The UE transmits the PUSCH at the uplink subframe of the second component carrier which arrives first after at least j subframes since the subframe on which the PDCCH has been received. Here, j is set to a value large enough for guaranteeing the minimum signal processing time of the UE, i.e. 4 subframes in general. The UE receives the PHICH at the downlink subframe of the first component carrier which arrives first after at least j subframes since the subframe at which the PUSCH has transmitted at step 1607.

If the PHICH received at step 1607 or 1611 indicates HARQ NACK, the UE performs PUSCH retransmission and, otherwise, if ACK, new PUSCH transmission. Afterward, the UE returns the procedure to step 1601 to received PDCCH from the eNB and continue the procedure as described above. At this time, the UE receives the PDCCH for scheduling PUSCH retransmission on the same component carrier and at the same subframe where the PHICH has been transmitted at step 1607 or 1611.

Figure 17:
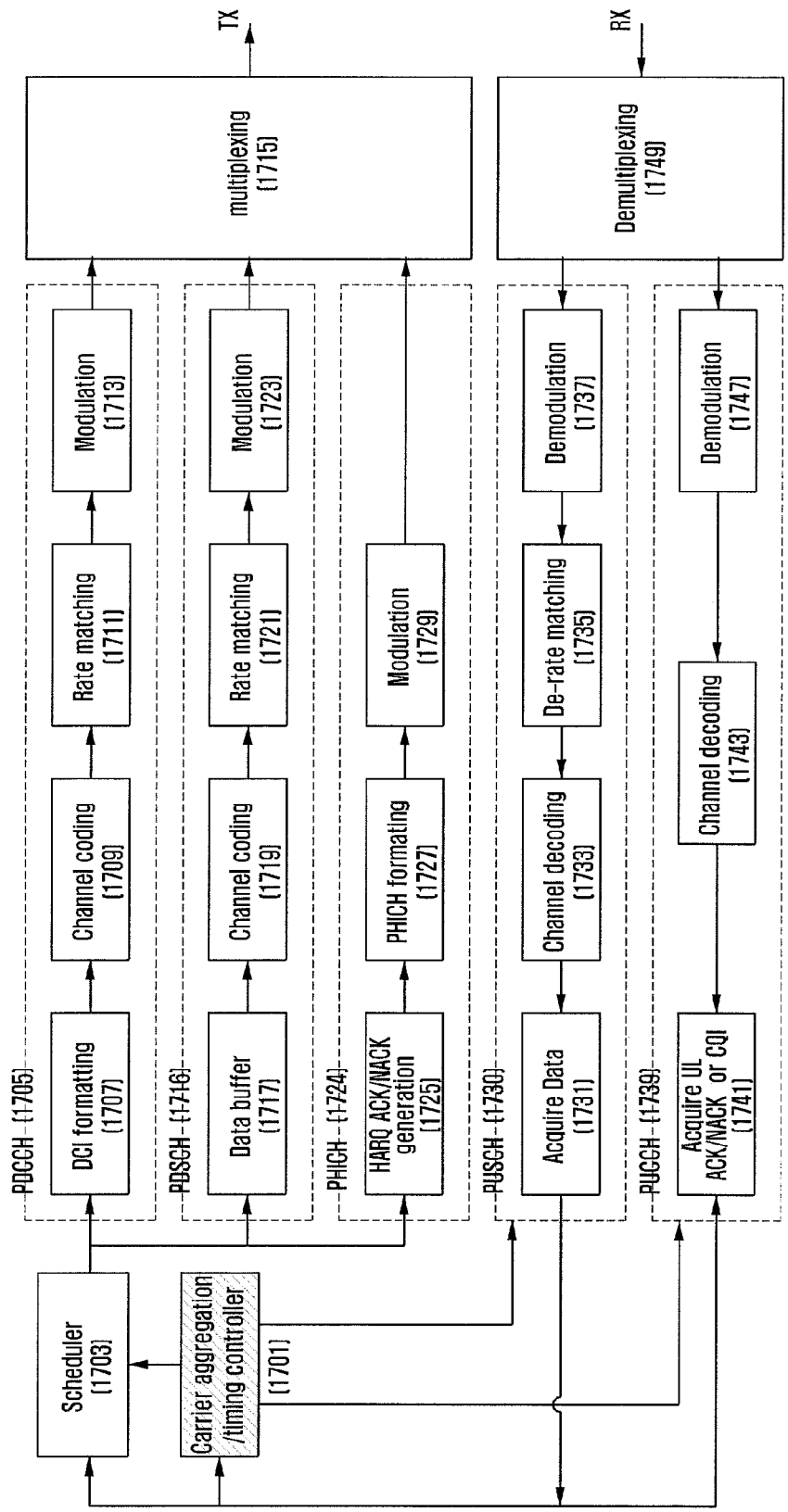
FIG. 17 is a diagram illustrating the eNB apparatus according to the $1^{st}$, $2^{nd}$, $3^{rd}$, and $4^{th}$ embodiments of the present invention.

FIG. 17 shows the eNB apparatus according to the $1^{st}$, $2^{nd}$, $3^{rd}$, and $4^{th}$ embodiments of the present invention. Referring to FIG. 17, the eNB apparatus comprises a transmission part including a PDCCH block 1705, a PDSCH block 1716, a PHICH block 1724, a multiplexer 1715; a reception part including a PUSCH block 1730, and PUCCH block 1739, and demultiplexer 1749; a carrier aggregation and timing controller 1701; and a scheduler 1703. The PDCCH block 1705 of the transmission part includes a DCI formatter 170107, a channel coder 1709, a rate matcher 1711, and a modulator 1713; the PDSCH block 1716 includes a data buffer 1717, a channel coder 1719, a rate matcher 1721, and a modulator 1723; and the PHICH block 1724 includes an HARQ ACK/NACK generator 1725, a PHICH generator 1727, and a modulator 1729. The PUSCH block 1730 of the reception part includes a demodulator 1737, de-rate matcher 1735, channel decoder 1733, and data acquirer 1731; and the PUCCH block 1739 includes a demodulator 1747, a de-rate matcher 1745, a channel decoder 1743, an ACK/NACK or CQI acquirer 1741.

The carrier aggregation and timing controller 1701 determines whether to apply carrier aggregation and the timing relationship among the physical channels based on the data amount to be transmitted and resource amount available in the system and notifies the scheduler 1703, the PUSCH block 1730, and PUCCH block 1739 of the determination result. The timing relationship is determined by the method according to the embodiment of the present invention.

In detail, the carrier aggregation and timing controller 1701 according to the first and second embodiments controls such that the downlink control channel is transmitted through the first component carrier and the downlink data channel scheduled by the downlink control channel is transmitted on the second component carrier based on the transmission timing rule in performing the cross-carrier scheduling. In this case, the carrier aggregation and timing controller 1701 may control such that the downlink control channel and the downlink data channels are transmitted at the subframe configured as downlink subframe on both the first and second component carriers. The carrier aggregation and timing controller 1701 also may control such that the downlink data channel is transmitted at the downlink subframe of the second component carrier which arrives first since the subframe at which the downlink control channel has been transmitted on the first component carrier.

The carrier aggregation and timing controller 1701 according to the first embodiment may control such that the uplink retransmission ACK/NACK signal transmitted by the UE in accordance with the TDD uplink-downlink configuration predetermined on the second component carrier.

Also, the carrier aggregation and timing controller 1701 according to the second embodiment may control such that the uplink retransmission ACK/NACK signal transmitted by the UE at the uplink subframe of the second component carrier which arrives first after at least j subframes since the subframe on which the downlink data channel has been received.

Also, the carrier aggregation and timing controller 1701 according to the third embodiment may controls such that the downlink control channel is transmitted at a certain subframe of the first component carrier and the uplink data channel scheduled by the downlink control channel is transmitted at the uplink subframe of the second component carrier which arrives first after at least j subframes since the subframe at which the downlink control channel has been transmitted, in performing the cross-carrier scheduling. In this case, the carrier aggregation and timing controller 1701 may control such that the retransmission ACK/NACK signal at the downlink subframe of the first component carrier which arrives first after at least j subframes since the subframe at which the uplink data channel has been received.

Also, the carrier aggregation and timing controller 1701 according to the fourth embodiment may control such that the downlink control channel is transmitted at a certain subframe of the first component carrier and the uplink data channel is received at the uplink subframe of the second component carrier which is scheduled by the downlink control channel, in performing the cross-carrier scheduling. In this case, the downlink control channel is transmitted at the subframe nearest to the subframe at which the uplink data channel is received among the downlink subframes of the first component carrier before at least j subframes preceding the subframe of the second component carrier at which the uplink data channel is received. The carrier aggregation and timing controller 1701 also may control such that the retransmission ACK/NACK signal is transmitted at the downlink subframe of the first component carrier which arrives first after at least j subframes since the subframe at which the uplink data channel has been received.

The PDCCH block 1705 generates a DCI by mans of the DCI formatter 1710, adds error correction capability to the DCI by means of the channel coder 1709, matches rate to the resource amount to which the DCI is mapped by means of the rate matcher 1711, modulates the rate match result by means of the modulator 1713, and multiplexes the modulation result with other signals by means of the multiplexer 1715, under the control of the scheduler.

The PDSCH block 1716 reads out the data to be transmitted from the data buffer 1717, adds error correction capability to the data by means of the channel coder 1719, matches the rate to the resource amount to which the data is mapped by means of the rate-matcher 1721, modulates the rate match result by means of the modulator 1723, and multiplexes the modulation result with other signals by means of the multiplexer 1715.

The PHICH block 1724 generates HARQ ACK/NACK corresponding to the PUSCH received from the UE by means of the HARQ ACK/NACK generator 1725 under the control of the scheduler 1703. The HARQ ACK/NACK is formatted to be suitable for the PHICH channel structure by means of the PHICH formatter 1727, modulated by means of the modulator 1729, and then multiplexed with other signals by means of the multiplexer 1715.

The multiplexed signals converted to OFDM signals to be transmitted to the UE.

The PUSCH block 1730 of the reception part separates the PUSCH signal form the signal received from UE by means of the demultiplexer 1749, demodulates the PUSCH by means of the demodulator 1737, de-rate matches the demodulation result to the signal before the rate matching by means of the de-rate matcher 1735, decodes the de-rate match result by means of the decoder 1733, and acquires the PUSCH by means of the data acquirer 1731. The data acquirer 1731 notifies the scheduler 1703 of the decoding result, i.e. whether error is detected, to control downlink HARQ ACK/NACK generation and notifies the carrier aggregation and timing controller 1701 of the decoding result, i.e. whether error is detected, to adjust downlink HARQ ACK/NACK transmission timing.

The PUCCH block 1730 separates PUCCH signal from the signal received from the UE by means of the demultiplexer 1749, demodulates the PUCCH signal by means of the demodulator 1747, decodes the demodulation result by means of the channel decoder 1733, and acquires uplink ACK/NACK or CQI by means of the uplink ACK/NACK or CQI acquirer 1741. The acquired ACK/NACK or CQI is provided to the scheduler 1703 so as to be used for determining PUSCH retransmission and modulation and coding scheme (MCS). The acquired uplink ACK/NACK is provided to the carrier aggregation and timing controller 1701 so as to be used for PDSCH transmission timing adjustment.

Figure 18:
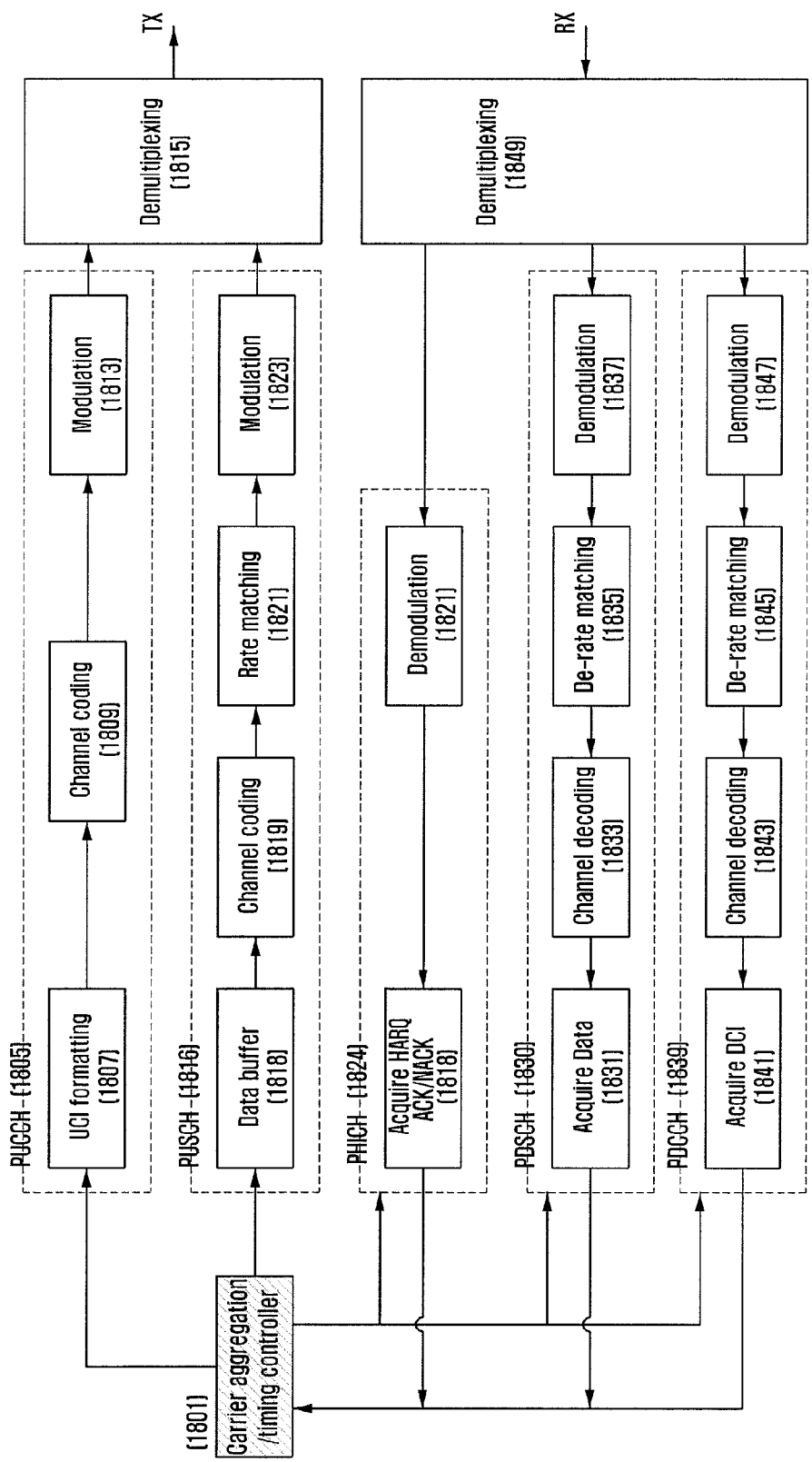
FIG. 18 is a diagram illustrating the UE apparatus according to the $1^{st}$, $2^{nd}$, $3^{rd}$, and $4^{th}$ embodiments of the present invention.

FIG. 18 shows the UE apparatus according to the $1^{st}$, $2^{nd}$, $3^{rd}$, and $4^{th}$ embodiments of the present invention. Referring to FIG. 18, the UE comprises a transmitter including a PUCCH block 1805, a PUSCH block 1816, and a multiplexer 1815; a receiver including a PHICH block 1824, a PDCCH block 1839, and a demultiplexer 1849; and a carrier aggregation and timing controller 1801. The PUCCH block 1805 of the transmitter includes a UCI formatter 1807, a channel coder 1809, and a modulator 1813; and the PUSCH block 1816 includes a data buffer 1818, a channel coder 1819, a rate matcher 1821, and a modulator 1823. The PHICH block 1824 of the receiver includes an HARQ ACK/NACK acquirer 1825 and a modulator 1829; the PDSCH block 1830 includes a demodulator 1837, a de-rate matcher 1835, a channel coder 1833, and a data acquirer 1831; and the PDCCH block 1839 includes a demodulator 1847, a de-rate matcher 1845, a channel coder 1843, and a DCI acquirer 1841.

The carrier aggregation and timing controller 1801 checks carrier aggregation state of the UE based on the DCI received from the eNB to determine the carrier for receiving the PDSCH in the cross-carrier scheduling and transmission/reception timing relationship among the physical channels and notifies the PUCCH block 1805, PUSCH block 1816, PHICH block 1824, PDSCH block 1830, and PDCCH block 1839 of the determination result. The timing relationship is determined according to the method described in the embodiments of the present invention.

According to the first and second embodiments, the carrier aggregation and timing controller 1801 controls such that, in cross-carrier scheduling, the downlink control channel is received on the first component carrier and the downlink data channel, which is scheduled by the downlink control channel, on the second component carrier according to a predetermined transmission timing rule of the downlink control can data channels. In this case, the carrier aggregation and timing controller 1701 may control such that the downlink control channel and the downlink data channel are received at the subframe which is configured as downlink subframe on both the first and second component carrier. The carrier aggregation and timing controller 1701 also may control such that the downlink data channel is received at the downlink subframe of the second component carrier which arrives first since the downlink control channel has been transmitted.

Particularly according to the first embodiment, the carrier aggregation and timing controller may control such that the uplink retransmission ACK/NACK signal is transmitted to the eNB according to a TDD uplink-downlink configuration predetermined on the second component carrier.

According to the second embodiment, the carrier aggregation and timing controller may controls such that the uplink retransmission ACK/NACK signal is transmitted to the eNB at the uplink subframe of the second component carrier which arrives first after at least j subframes since the subframe at which the downlink data channel has been received.

According to the third embodiment, the carrier aggregation and timing controller may controls such that, in cross-carrier scheduling, the downlink control channel is received at a certain subframe of the first component carrier and the uplink data channel scheduled by the downlink control channel is transmitted at the uplink subframe of the second component carrier which arrives first after at least j subframes since the subframe on which the downlink control channel has been transmitted. In this case, the carrier aggregation and timing controller may control such that the retransmission ACK/NACK signal is received at the downlink subframe of the first component carrier which arrives first after at least j subframes since the subframe at which the uplink data channel has been received.

According to the fourth embodiment, the carrier aggregation and timing controller may controls such that, in cross-carrier scheduling, the downlink control channel is received at a certain subframe of the first component carrier and the uplink data channel, which is scheduled by the downlink control channel, at the uplink subframe of the second component carrier. In this case, the downlink control channel is received at the subframe nearest to the subframe carrying the uplink data channel among the downlink subframes of the first component carrier before at least j subframes preceding the subframe of the second component carrier at which the uplink data channel is received. According to the fourth embodiment, the carrier aggregation and timing controller controls such that the retransmission ACK/NACK signal is received at the downlink subframe of the first component carrier which arrives first after at least j subframes since the subframe at which the uplink data channel is received.

The PUCCH block 1805 generates HARQ ACK/NACK or CQI based on the Uplink Control Information (UCI) by means of the UCI formatter 1807 under the timing control of the carrier aggregation and timing controller 1701, adds error correction capability to the UCI by means of the channel coder 1809, modulates the channel-coded result by means of the modulator 1813, and multiplexes the modulation result with other signals by means of the multiplexer 1815.

The PUSCH block 1816 reads out data from the data buffer 1818 under the timing control of the carrier aggregation and timing controller 1801, adds error correction capability to the data by means of the channel coder 1819, rate-matches the channel-coding result to the resource amount for actual mapping, modulates the rate-match result by means of the modulator 1823, and multiplex the modulation result with other signals by means of the multiplexer 1815.

The multiplexed signals are converted into Single Carrier Frequency Division Multiple Access (SC-FDMA) signal to be transmitted to the eNB.

The PHICH block 1824 of the receiver separates PHICH signal from the signal transmitted by the UE by means of the demultiplexer 1849, demodulates the PHICH signal by means of the demodulator 1829, and acquires HARQ ACK/

NACK corresponding to PUSCH by means of the HARQ ACK/NACK acquirer 1825. The HARQ ACK/NACK information corresponding to the PUSCH is delivered to the carrier aggregation and timing controller 1801 so as to be used for determining PUSCH retransmission timing of the UE.

The PDSCH block 1830 separates PDSCH signal from the signal transmitted by the eNB by means of the demultiplexer 1849, demodulates the PDSCH signal by means of the demodulator 1837, de-rate matches the demodulation result to the symbols before being rate-matched, decodes the de-rate match result by mean of the channel decoder 1833, and acquires PDSCH data by means of the data acquirer 1831. The data acquire 1831 notifies the PUCCH block 1805 of the decoding result erroneous or not to generate uplink HARQ ACK/NACK and notifies the carrier aggregation and timing controller 1801 of the decoding result so as to determine the uplink HARQ ACK/NACK transmission timing.

The PDCCH block 1839 separates PDCCH signal from the signal transmitted by the eNB by means of the demultiplexer 1849, demodulates the PDCCH signal by means of the demodulator 1847, decodes the demodulation result by means of the channel decoder 1833, and acquires DCI by means of the DCI acquirer 1841. The DCI is delivered to the carrier aggregation and timing controller 1801 to determine the PUSCH transmission timing of the UE.

While embodiments of the present invention have been shown and described in the specification and drawings to illustrate and explain the present invention, it should be understood that the present invention is not limited to these specific embodiments. That is, it is obvious to those skilled in the art that various changes and modification may be made therein without departing from the technical concept of the invention.

What is claimed is:

1. A method by a base station in a mobile communication system employing time division duplexing, the method comprising:
   transmitting, to a terminal, first subframe configuration information of a first cell;
   transmitting, to the terminal, information for activating a second cell, second subframe configuration information of the second cell, and configuration information of cross-carrier scheduling;
   transmitting, to the terminal, scheduling information on a control channel of the first cell based on the configuration information of cross-carrier scheduling; and
   transmitting, to the terminal, data on a shared channel of the second cell based on the scheduling information,
   wherein the scheduling information is transmitted in a downlink subframe or a special subframe based on the first subframe configuration information for the first cell,
   wherein the data is transmitted in a downlink subframe or a special subframe for the second cell, which corresponds to the downlink subframe or the special subframe for the first cell, and
   wherein the first subframe configuration information is different from the second subframe configuration information.

2. The method of claim 1, wherein the first subframe configuration information and the second subframe configuration information include at least one of a downlink subframe, a uplink subframe, and a special subframe.

3. The method of claim 1, further comprising:
   generating the scheduling information of the second cell.

4. The method of claim 1, further comprising:
   receiving a Hybrid Automatic Repeat Request—ACKnowledgement (HARQ-ACK) response corresponding to the data on the second cell from the terminal according to the second subframe configuration information.

5. The method of claim 1, wherein the control channel comprises Physical Downlink Control CHannel (PDCCH) and the shared channel comprises Physical Downlink Shared CHannel (PDSCH).

6. The method of claim 1, wherein the scheduling information is transmitted in a subframe in which scheduling information transmission is restricted according to the first subframe configuration information.

7. A method by a terminal in a mobile communication system employing time division duplexing, the method comprising:
   receiving, from a base station, first subframe configuration information of a first cell;
   receiving, from the base station, information for activating a second cell, second subframe configuration information of the second cell, and configuration information of cross-carrier scheduling;
   receiving, from the base station, scheduling information on a control channel of the first cell based on the configuration information of cross-carrier scheduling; and
   receiving, from the base station, data on a shared channel of the second cell based on the scheduling information,
   wherein the scheduling information is received in a downlink subframe or a special subframe based on the first subframe configuration information for the first cell,
   wherein the data is received in a downlink subframe or a special subframe for the second cell, which corresponds to the downlink subframe or the special subframe for the first cell, and
   wherein the first subframe configuration information is different from the second subframe configuration information.

8. The method of claim 7, wherein the first subframe configuration information and the second subframe configuration information include at least one of a downlink subframe, a uplink subframe, and a special subframe.

9. The method of claim 7, further comprising:
   monitoring the control channel on the first cell.

10. The method of claim 7, further comprising:
    transmitting a Hybrid Automatic Repeat Request—ACKnowledgement (HARQ-ACK) response corresponding to the data on the second cell to the terminal according to the subframe configuration of the second cell.

11. The method of claim 7, wherein the control channel comprises Physical Downlink Control CHannel (PDCCH) and the shared channel comprises Physical Downlink Shared CHannel (PDSCH).

12. The method of claim 7, wherein the scheduling information is received in a subframe in which scheduling information transmission is restricted according to subframe configuration of the first cell.

13. A base station in a mobile communication system employing time division duplexing, the base station comprising:
    a transceiver which transmits/receives at least one signal; and
    a controller configured to:
      transmit, to a terminal, first subframe configuration information of a first cell,
      transmit, to the terminal, information for activating a second cell, second subframe configuration information of the second cell, and configuration information of cross-carrier scheduling, transmit, to the terminal, scheduling information on a control channel of the first cell based on the configuration information of cross-carrier scheduling, and transmit, to the terminal, data on a shared channel of the second cell based on the scheduling information, wherein the scheduling information is transmitted in a downlink subframe or a special subframe based on the first subframe configuration information for the first cell, wherein the data is transmitted in a downlink subframe or a special subframe for the second cell, which corresponds to the downlink subframe or the special subframe for the first cell, and wherein the first subframe configuration information is different from the second subframe configuration information.

14. The method of claim 13, wherein the first subframe configuration information and the second subframe configuration information include at least one of a downlink subframe, a uplink subframe, and a special subframe.

15. The base station of claim 13, wherein the controller is configured to:
generate the scheduling information of the second cell.

16. The base station of claim 13, wherein the controller is configured to:
receive a Hybrid Automatic Repeat Request—ACKnowledgement (HARQ-ACK) response corresponding to the data on the second cell from the terminal according to the second subframe configuration information.

17. The base station of claim 13, wherein the control channel comprises Physical Downlink Control CHannel (PDCCH) and the shared channel comprises Physical Downlink Shared CHannel (PDSCH).

18. The base station of claim 13, wherein the controller is configured to transmit the scheduling information in a subframe in which scheduling information transmission is restricted according to the first subframe configuration information.

19. A terminal in a mobile communication system employing time division duplexing, the terminal comprising:
a transceiver which transmits/receives at least one signal; and a controller configured to:
receive, from a base station, first subframe configuration information of a first cell,
receive, from the base station, information for activating a second cell, second subframe configuration information of the second cell, and configuration information of cross-carrier scheduling,
receive, from the base station, scheduling information on a control channel of the first cell based on the configuration information of cross-carrier scheduling, and
receive, from the base station, data on a shared channel of the second cell based on the scheduling information, wherein the scheduling information is received in a downlink subframe or a special subframe based on the first subframe configuration information for the first cell, wherein the data is received in a downlink subframe or a special subframe for the second cell, which corresponds to the downlink subframe or the special subframe for the first cell, and wherein the first subframe configuration information is different from the second subframe configuration information.

20. The method of claim 19, wherein the first subframe configuration information and the second subframe configuration information include at least one of a downlink subframe, a uplink subframe, and a special subframe.

21. The terminal of claim 19, wherein the controller is configured to:
monitor the control channel on the first cell.

22. The terminal of claim 19, wherein the controller is configured to:
transmit a Hybrid Automatic Repeat Request—ACKnowledgement (HARQ-ACK) response corresponding to the data on the second cell to the terminal according to the subframe configuration of the second cell.

23. The terminal of claim 19, wherein the control channel comprises Physical Downlink Control CHannel (PDCCH) and the shared channel comprises Physical Downlink Shared CHannel (PDSCH).

24. The terminal of claim 19, wherein the controller is configured to receive the scheduling information in a subframe in which scheduling information transmission is restricted according to the subframe configuration of the first cell.

* * * * *